(12) United States Patent
Almquist et al.

(10) Patent No.: US 12,401,477 B2
(45) Date of Patent: Aug. 26, 2025

(54) METHOD FOR SELECTING PHYSICAL UPLINK CONTROL CHANNEL (PUCCH) ORTHOGONAL COVER CODES (OCC) REPETITION SEQUENCE

(71) Applicant: Telefonaktiebolaget LM Ericsson (publ), Stockholm (SE)

(72) Inventors: Gustav Almquist, Järfälla (SE); Stephen Grant, Pleasanton, CA (US)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 420 days.

(21) Appl. No.: 17/626,571

(22) PCT Filed: Apr. 24, 2020

(86) PCT No.: PCT/IB2020/053887
§ 371 (c)(1),
(2) Date: Jan. 12, 2022

(87) PCT Pub. No.: WO2021/009575
PCT Pub. Date: Jan. 21, 2021

(65) Prior Publication Data
US 2022/0247537 A1    Aug. 4, 2022

Related U.S. Application Data

(60) Provisional application No. 62/873,623, filed on Jul. 12, 2019.

(51) Int. Cl.
*H04L 5/00* (2006.01)
*H04L 27/26* (2006.01)
*H04W 16/14* (2009.01)

(52) U.S. Cl.
CPC ........ *H04L 5/0051* (2013.01); *H04L 27/2602* (2013.01); *H04W 16/14* (2013.01)

(58) Field of Classification Search
None
See application file for complete search history.

(56) References Cited

U.S. PATENT DOCUMENTS 9,544,883 B2 * 1/2017 Tang ................ H04L 1/0029
2011/0206089 A1   8/2011 Cho et al.
(Continued)

FOREIGN PATENT DOCUMENTS

CN   103155468 B * 9/2015   ........... H04L 1/1607
CN   105027653 A * 11/2015   .............. H04J 11/00
(Continued)

OTHER PUBLICATIONS

3GPP TS 38.211 V15.6.0 (Jun. 2019).*
(Continued)

*Primary Examiner* — Andrew C Oh
(74) *Attorney, Agent, or Firm* — Withrow & Terranova, PLLC

(57) ABSTRACT

A method for selecting orthogonal cover codes repetition sequence for Physical Uplink Control Channel (PUCCH) transmission in a New Radio-Unlicensed (NR-U) network is provided. In embodiments disclosed herein, a set of time domain and/or frequency domain variables, $\Phi$, is first determined to be used in a function, $f(\Phi)$, that determines a selected PUCCH sequence, $r_f(m)$, among at least two PUCCH sequences to be repeated with Orthogonal Cover Codes (OCC). Accordingly, a subset of the selected PUCCH sequence, $r_f(m)$, is repeated with OCC. By employing the method disclosed herein to determine the selected PUCCH sequence, $r_f(m)$, for repetition with OCC, it is possible to satisfy the occupied bandwidth and the maximum Power Spectral Density (PSD) requirements mandated in the NR-U network.

22 Claims, 11 Drawing Sheets

(56) References Cited

U.S. PATENT DOCUMENTS

| | | | |
|---|---|---|---|
| 2012/0140716 A1* | 6/2012 | Baldemair | H04J 13/18 |
| | | | 370/329 |
| 2013/0114501 A1* | 5/2013 | Kishiyama | H04J 13/0059 |
| | | | 370/328 |
| 2018/0220415 A1* | 8/2018 | Yin | H04L 5/0094 |
| 2019/0158339 A1 | 5/2019 | Park et al. | |

FOREIGN PATENT DOCUMENTS

| | | | | |
|---|---|---|---|---|
| CN | 107210855 A | * | 9/2017 | H04L 1/0063 |
| CN | 104335517 B | * | 10/2017 | H04L 1/1671 |
| CN | 107925542 A | * | 4/2018 | H04L 5/00 |
| CN | 108111287 A | * | 6/2018 | H04L 27/2613 |
| CN | 108370297 A | | 8/2018 | |
| CN | 109391414 A | * | 2/2019 | H04L 5/0048 |
| CN | 110035561 A | * | 7/2019 | H04B 1/713 |
| CN | 111917524 A | * | 11/2020 | H04L 1/1812 |
| CN | 110035511 B | * | 3/2021 | H04L 5/0053 |
| CN | 110999152 B | * | 8/2022 | H04L 1/0026 |
| EP | 2775682 A2 | * | 9/2014 | H04L 27/2656 |
| EP | 3282626 A1 | * | 2/2018 | H04L 27/26 |
| JP | 5701990 B2 | * | 4/2015 | H04B 7/0413 |
| WO | WO-2016050323 A1 | * | 4/2016 | H03M 13/091 |
| WO | WO-2017132810 A1 | * | 8/2017 | H04B 7/0626 |
| WO | WO-2018144470 A1 | * | 8/2018 | H04B 7/04 |
| WO | WO-2018175578 A1 | * | 9/2018 | H04L 5/0007 |
| WO | WO-2018175801 A1 | * | 9/2018 | H04L 5/0048 |
| WO | 2019029362 A1 | | 2/2019 | |
| WO | WO-2019050355 A1 | * | 3/2019 | H04L 1/0031 |
| WO | WO-2019050368 A1 | * | 3/2019 | H04B 7/0456 |
| WO | WO-2019069465 A1 | * | 4/2019 | H04W 72/21 |
| WO | WO-2019138514 A1 | * | 7/2019 | H01J 13/18 |
| WO | WO-2019159300 A1 | * | 8/2019 | H04B 1/713 |
| WO | WO-2019163111 A1 | * | 8/2019 | H04L 27/2678 |

OTHER PUBLICATIONS

Author Unknown, "Technical Specification Group Radio Access Network; NR; Physical channels and modulation (Release 15)," Technical Specification 38.211, Version 15.6.0, Jun. 2019, 3GPP Organizational Partners, 97 pages.

Author Unknown, "Technical Specification Group Radio Access Network; NR; Multiplexing and channel coding (Release 15)," Technical Specification 38.212, Version 15.6.0, Jun. 2019, 3GPP Organizational Partners, 101 pages.

Ericsson, "R1-1907460: Enhanced PUCCH design details," 3GPP TSG-RAN WG1 Meeting #97, May 13-17, 2019, Reno, Nevada, 13 pages.

Qualcomm Incorporated, "R1-1813898: Lower PAPR reference signals," 3GPP TSG RAN WG1 Meeting #95, Nov. 12-16, 2018, Spokane, Washington, 25 pages.

Qualcomm Incorporated, "R1-1900908: Lower PAPR reference signals," 3GPP TSG RAN WG1 Ad-Hoc Meeting 1901, Jan. 21-25, 2019, Taipei, Taiwan, 21 pages.

International Search Report and Written Opinion for International Patent Application No. PCT/IB2020/053887, mailed Jul. 27, 2020, 15 pages.

International Preliminary Report on Patentability for International Patent Application No. PCT/IB2020/053887, mailed Oct. 13, 2021, 22 pages.

First Office Action for Chinese Patent Application No. 202080050864. 8, mailed Jun. 26, 2023, 9 pages.

Notice of Reasons for Refusal for Japanese Patent Application No. 2021-577667, mailed Apr. 3, 2023, 15 pages.

Office Action for Colombian Patent Application No. NC2022/0000053, mailed Oct. 1, 2024, 21 pages.

Second Office Action for Chinese Patent Application No. 202080050864. 8, mailed Oct. 14, 2023, 10 pages.

Examination Report for European Patent Application No. 20723538. 3, mailed Dec. 1, 2023, 5 pages.

Notice of Reasons for Refusal for Japanese Patent Application No. 2021-577667, mailed Dec. 15, 2023, 12 pages.

Decision of Refusal for Japanese Patent Application No. 2021-577667, mailed Jun. 21, 2024, 7 pages.

* cited by examiner

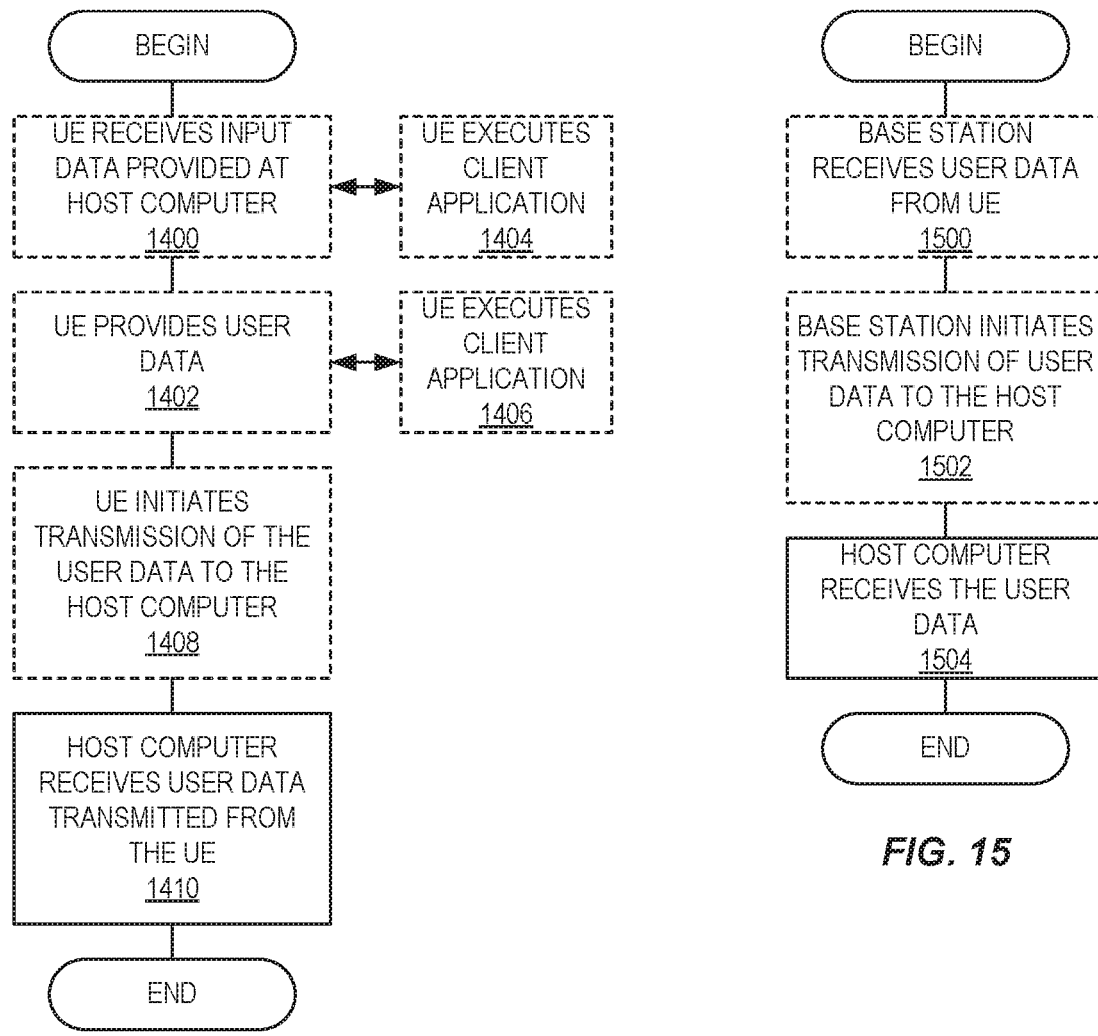

METHOD FOR SELECTING PHYSICAL UPLINK CONTROL CHANNEL (PUCCH) ORTHOGONAL COVER CODES (OCC) REPETITION SEQUENCE

RELATED APPLICATIONS

This application is a 35 U.S.C. § 371 national phase filing of International Application No. PCT/IB2020/053887, filed Apr. 24, 2020, which claims the benefit of provisional patent application Ser. No. 62/873,623, filed Jul. 12, 2019, the disclosures of which are hereby incorporated herein by reference in their entireties.

TECHNICAL FIELD

The technology of the disclosure relates generally to Physical Uplink Control Channel (PUCCH) transmission in a New Radio-Unlicensed (NR-U) network.

BACKGROUND

The New Radio (NR) standard in Third Generation Partnership Project (3GPP) is being designed to provide service for multiple use cases such as Enhanced Mobile Broadband (eMBB), Ultra-Reliable and Low Latency Communication (URLLC), and Machine Type Communication (MTC). Each of these services has different technical requirements. For example, the general requirement for eMBB is high data rate with moderate latency and moderate coverage, while URLLC service requires a low latency and high reliability transmission but perhaps for moderate data rates.

One of the solutions for low latency data transmission is shorter transmission time intervals. In NR, in addition to transmission in a slot, a mini-slot transmission is also allowed to reduce latency. A mini-slot may consist of any number of 1 to 14 Orthogonal Frequency Division Multiplexing (OFDM) symbols. It should be noted that the concepts of slot and mini-slot are not specific to a specific service, meaning that a mini-slot may be used for either eMBB, URLLC, or other services.

FIG. 1 illustrates radio resources in NR. As can be seen in FIG. 1, NR radio resources comprise a time-frequency grid, where each Resource Element (RE) corresponds to one OFDM subcarrier during one OFDM symbol interval. A symbol interval comprises a Cyclic Prefix (CP), which is a prefixing of a symbol with a repetition at the end of the symbol to act as a guard band between symbols and/or facilitate frequency domain processing. Frequencies f or subcarriers having a subcarrier spacing Δf are defined along a Y-axis (e.g., frequency domain) and symbols are defined along an X-axis (e.g., time domain).

Resource Blocks

A Physical Resource Block (PRB) is defined as 12 consecutive subcarriers in the frequency domain and one slot of 0.5 ms in the time domain. For normal CP, one slot contains 7 OFDM symbols. A pair of two adjacent resource blocks in time direction covering 1.0 ms is known as a resource block pair. Resource blocks are numbered in the frequency domain, starting with resource block 0 from one end of the system bandwidth. For a normal CP, one subframe consists of two slots, i.e., 14 OFDM symbols.

Numerologies

For NR, the term "numerologies" refers to different configurations of OFDM-based sub-frames having different parameters such as Subcarrier Spacing (SCS), symbol time, CP size, etc. Generally speaking, as the numerology value increases, subcarrier spacing increases, the number of slots in a subframe increases, and the number of symbols sent in a given time also increases. As the number of slots increases, the duration of each slot gets shorter. Table 1 shows this relationship:

TABLE 1

Supported Transmission Numerologies

| Numerology ($\mu$) | Subcarrier spacing ($\Delta f = 2^{\mu} \cdot 15$ [kHz]) | Slot duration | Cyclic prefix |
|---|---|---|---|
| 0 | 15 | 1 ms | Normal |
| 1 | 30 | 500 us | Normal |
| 2 | 60 | 250 us | Normal, Extended |
| 3 | 120 | 125 us | Normal |

Bandwidth Part (BWP)

Different numerologies can be transmitted on the same carrier frequency with a new feature called Bandwidth Parts (BWPs). These can be multiplexed in the frequency domain. In Rel-15 NR, a User Equipment (UE) can be configured with up to four carrier BWPs in the downlink with a single downlink carrier BWP being active at a given time. A UE can be configured with up to four carrier BWPs in the uplink with a single uplink carrier BWP being active at a given time. If a UE is configured with a supplementary uplink, the UE can in addition be configured with up to four carrier BWPs in the supplementary uplink with a single supplementary uplink carrier BWP being active at a given time.

For a carrier BWP with a given numerology $\mu_i$, a contiguous set of PRBs are defined and numbered from 0 to $N_{BWP}^{size}-1$, where i is the index of the carrier BWP. Multiple OFDM numerologies, $\mu$, are supported in NR as given by Table 1, where the subcarrier spacing, $\Delta f$, and the cyclic prefix for a carrier BWP are configured by different higher layer parameters for downlink and uplink, respectively.

Physical Channels

A downlink physical channel corresponds to a set of resource elements carrying information originating from higher layers. The following downlink physical channels are defined:

Physical Downlink Shared Channel (PDSCH). PDSCH is the main physical channel used for unicast downlink data transmission, but also for transmission of Random Access Response (RAR), e.g., a PRACH Response (MSG2), certain system information blocks, and paging information.

Physical Broadcast Channel (PBCH). PBCH carries the basic system information, required by the UE to access the network.

Physical Downlink Control Channel (PDCCH). PDCCH is used for transmitting Downlink Control Information (DCI), mainly scheduling decisions, required for reception of PDSCH, and for uplink scheduling grants enabling transmission on PUSCH.

An uplink physical channel corresponds to a set of resource elements carrying information originating from higher layers. The following uplink physical channels are defined:

Physical Uplink Shared Channel (PUSCH). PUSCH is the uplink counterpart to the PDSCH.

Physical Uplink Control Channel (PUCCH). PUCCH is used by UEs to transmit uplink control information, including Hybrid Automatic Repeat Request (HARQ) acknowledgements, Channel State Information (CSI) reports, etc.

Physical Random Access Channel (PRACH). PRACH is used for Random Access (RA) preamble transmission, e.g., a PRACH Preamble (MSG1).

Frequency Resource Allocation for PUSCH and PDSCH

In general, a UE shall determine the RB assignment in frequency domain for PUSCH or PDSCH using the resource allocation field in the detected DCI carried in PDCCH. For PUSCH carrying MSG3 (e.g., an RRC Connection Request) in a random-access procedure, the frequency domain resource assignment is signaled by using an Uplink (UL) grant contained in RAR.

In NR, two frequency resource allocation schemes, type 0 and type 1, are supported for PUSCH and PDSCH. Which type to use for a PUSCH/PDSCH transmission is either defined by a Radio Resource Control (RRC)-configured parameter or indicated directly in the corresponding DCI or UL grant in RAR (for which type 1 is used).

The RB indexing for uplink/downlink type 0 and type 1 resource allocation is determined within the UE's active carrier BWP, and the UE shall, upon detection of PDCCH intended for the UE, first determine the uplink/downlink carrier BWP and then determine the resource allocation within the carrier BWP. The UL BWP for PUSCH carrying MSG3 is configured by higher layer parameters.

Cell Search and Initial Access Related Channels and Signals

For cell search and initial access, these channels are included: Synchronization Signal (SS)/PBCH block, PDSCH carrying Remaining Minimum System Information (RMSI)/RAR/MSG4 scheduled by PDCCH channels carrying DCI, PRACH channels and PUSCH channel carrying MSG3.

The SS/PBCH block (hereinafter, "SSB") comprises the above signals (Primary Synchronization Signal (PSS), Secondary Synchronization Signal (SSS) and PBCH Demodulation Reference Signal (DMRS)), and PBCH. SSB may have 15 kHz, 30 kHz, 120 kHz or 240 kHz SCS depending on the frequency range.

NR-Unlicensed

NR-Unlicensed (NR-U) is being studied in 3GPP to bring NR to the unlicensed bands. Two requirements are commonly found in regulations for operation in unlicensed spectrum: (1) occupied channel bandwidth, and (2) maximum Power Spectral Density (PSD).

The occupied bandwidth requirement states that the transmitted signal power occupy a large portion of the declared Nominal Channel Bandwidth.

Maximum PSD requirements exist in many different regions. The implication of the PSD requirement is that without a proper physical layer signal design, a signal with small transmission bandwidth will be limited in transmission power. This can negatively affect coverage in an NR-U network.

It may be possible to satisfy the NR-U requirements by introducing frequency domain interlaced transmissions in the UL, such as using multiple PRBs spread over the available bandwidth. This allows a UE to transmit with higher power (and, to a lesser extent, to satisfy the occupied channel bandwidth requirement) even when the scheduled bandwidth need is small. It is expected that NR will adopt a similar design philosophy to support unlicensed operations.

SUMMARY

Embodiments disclosed herein include a method for selecting orthogonal cover codes repetition sequence for Physical Uplink Control Channel (PUCCH) transmission in a New Radio-Unlicensed (NR-U) network. In embodiments disclosed herein, a set of time domain and/or frequency domain variables, $\Phi$, is first determined to be used in a function, $f(\Phi)$, that determines a selected PUCCH sequence, $r_l(m)$, among at least two PUCCH sequences to be repeated with Orthogonal Cover Codes (OCC). Accordingly, a subset of the selected PUCCH sequence, $r_l(m)$, is repeated with OCC. By employing the method disclosed herein to determine the selected PUCCH sequence, $r_l(m)$, for repetition with OCC, it is possible to satisfy the occupied bandwidth and the maximum Power Spectral Density (PSD) requirements mandated in the NR-U network.

In one embodiment, a method, performed by a wireless device, for selecting a PUCCH OCC repetition sequence is provided. The method includes determining a first set of variables, $\Phi$, necessary to select a PUCCH sequence, $r_l(m)$, among at least two PUCCH sequences to be repeated for use with OCC. The method also includes using the determined first set of variables, $\Phi$, in a function, $f(\Phi)$, to determine the selected PUCCH sequence, $r_l(m)$, to be repeated for use with OCC. The method also includes using at least a subset of the selected PUCCH sequence, $r_l(m)$, to be repeated with OCC.

In another embodiment, determining the first set of variables $\Phi$ comprises determining the first set of variables $\Phi$ using a function $f_\Phi$ that selects the first set of variables $\Phi$ based on a plurality of sets of variables $\Phi_0, \Phi_1, \ldots, \Phi_N$.

In another embodiment, the function $f_\Phi$ selects the first set of variables $\Phi$ based on a calculation performed on at least one of the plurality of sets of variables $\Phi_0, \Phi_1, \ldots, \Phi_N$.

In another embodiment, the calculation performed on at least one of the plurality of sets of variables $\Phi_0, \Phi_1, \ldots, \Phi_N$ comprises performing at least one of the following set of functions: minimum( ), maximum( ), mean( ), median( ), sum( ), product( ), first_element( ), last_element( ), round( ), floor( ), and ceil( ).

In another embodiment, the first set of variables $\Phi$ comprises at least one orthogonal frequency division multiplexing (OFDM) symbol number within a slot, l, and a respective slot number of the slot within a radio frame, $n_{s,f}^\mu$, $\Phi=f_\Phi(l_0, l_1, \ldots, l_N, n_{s,f\_0}^\mu, n_{s,f\_1}^\mu, \ldots, n_{s,f\_N}^\mu)$.

In another embodiment, the at least one OFDM symbol within the slot, l, is determined based on a function $f_l( )$ expressed as: $l=f_l(l_0, l_1, \ldots, l_N)$ and the respective slot number of the slot within the radio frame, $n_{s,f}^\mu$, is determined based on a function $f_{n_{s,f}^\mu}( )$ expressed as: $n_{s,f}^\mu=f_{n_{s,f}^\mu}(n_{s,f\_0}^\mu, n_{s,f\_1}^\mu, \ldots, n_{s,f\_N}^\mu)$.

In another embodiment, the function $f_l( )$ and the function $f_{n_{s,f}^\mu}( )$ each comprise any combination of one or more of the following set of functions: minimum( ), maximum( ), mean ( ), median( ), sum( ), product( ), first_element( ), last_element( ), round( ), floor( ), and ceil( ).

In another embodiment, using the determined first set of variables to determine the selected PUCCH sequence comprises determining the selected PUCCH sequence as a Pseudo-random Number (PN)-sequence based on the function, $f(\Phi)$, of the first set of variables, $\Phi$.

In another embodiment, the function, $f(\Phi)$, for determining the selected PUCCH sequence defines the selected PUCCH sequence based on a length-31 Gold sequence.

In another embodiment, the method is applied to an enhanced NR PUCCH format 2 to support an inter-OFDM symbol OCC or an intra-OFDM symbol OCC.

In another embodiment, the PUCCH sequence, $r_l(m)$ is further denoted as a sequence $x(n)$.

In another embodiment, using at least a subset of the selected PUCCH sequence, $r_l(m)$, to be repeated with OCC comprises selecting a subset of the sequence $x(n)$ by selecting the subset of the sequence as any one of: $n=\{1, 2, \ldots, S-1, S\}$, $n=\{T-S+1, \ldots T-1, T\}$, and every $m^{th}$ element of $x(n)$ starting at any index n from 1 to m, for a specified value of m. Herein, T is the length of $x(n)$ and S is the length of the subset.

In another embodiment, a wireless device is provided. The wireless device includes processing circuitry. The processing circuitry is configured to determine a first set of variables, $\Phi$, necessary to select a PUCCH sequence, $r_l(m)$, among at least two PUCCH sequences to be repeated for use with OCC. The processing circuitry is also configured to use the determined first set of variables, $\Phi$, in a function, $f(\Phi)$, to determine the selected PUCCH sequence, $r_l(m)$, to be repeated for use with OCC. The processing circuitry is also configured to use at least a subset of the selected PUCCH sequence, $r_l(m)$, to be repeated with OCC.

In another embodiment, the processing circuitry is further configured to determine the first set of variables $\Phi$ using a function $f_\Phi$ that selects the first set of variables $\Phi$ based on a plurality of sets of variables $\Phi_0, \Phi_1, \ldots, \Phi_N$.

In another embodiment, the function $f_0$ selects the first set of variables $\Phi$ based on a calculation performed on at least one of the plurality of sets of variables $\Phi_0, \Phi_1, \ldots, \Phi_N$.

In another embodiment, the calculation performed on at least one of the plurality of sets of variables $\Phi_0, \Phi_1, \ldots, \Phi_N$ comprises performing at least one of the following set of functions: minimum( ), maximum( ), mean( ), median( ), sum( ), product( ), first_element( ), last_element( ), round( ), floor( ), and ceil( ).

In another embodiment, the first set of variables $\Phi$ comprises at least one OFDM symbol number within a slot, l, and a respective slot number of the slot within a radio frame, $n_{s,f}^\mu$: $\Phi=f\Phi(l_0, l_1, \ldots, l_N, n_{s,f\_0}^\mu, n_{s,f\_1}^\mu, \ldots, n_{s,f\_N}^\mu)$.

In another embodiment, the at least one OFDM symbol within the slot, l, is determined based on a function $f_l( )$ expressed as: $l=f_l(l_0, l_1, \ldots, l_N)$ and the respective slot number of the slot within the radio frame, $n_{s,f}^\mu$, is determined based on a function $f_{n_{s,f}^\mu}( )$ expressed as: $n_{s,f}^\mu=f_{n_{s,f}^\mu}(n_{s,f\_0}^\mu, n_{s,f\_1}^\mu, \ldots, n_{s,f\_N}^\mu)$.

In another embodiment, the function $f_l( )$ and the function $f_{n_{s,f}^\mu}( )$ each comprise any combination of one or more the following set of functions: minimum( ), maximum( ), mean ( ), median( ), sum( ), product( ), first_element( ), last_element( ), round( ), floor( ), and ceil( ).

In another embodiment, the processing circuitry is further configured to determine the selected PUCCH sequence as a PN sequence based on the function, $f(\Phi)$, of the first set of variables, $\Phi$.

In another embodiment, the function, $f(\Phi)$, defines the selected PUCCH sequence based on a length-31 Gold sequence.

In another embodiment, the processing circuitry is further configured to use at least a subset of the selected PUCCH sequence to be repeated with OCC in an enhanced NR PUCCH format 2 to support inter-OFDM symbol OCC or intra-OFDM symbol OCC.

In another embodiment, the PUCCH sequence, $r_l(m)$ is further denoted as a sequence $x(n)$.

In another embodiment, the processing circuitry is further configured to select a subset of the sequence $x(n)$ by selecting the subset of the sequence as any one of: $n=\{1, 2, \ldots, S-1, S\}$, $n=\{T-S+1, \ldots T-1, T\}$, and every $m^{th}$ element of $x(n)$ starting at any index n from 1 to m, for a specified value of m. Herein, T is the length of $x(n)$ and S is the length of the subset.

BRIEF DESCRIPTION OF THE DRAWINGS

The accompanying drawing figures incorporated in and forming a part of this specification illustrate several aspects of the disclosure, and together with the description serve to explain the principles of the disclosure.

FIG. 14 is a flowchart illustrating a method implemented in a communication system in accordance with one embodiment of the present disclosure; and FIG. 15 is a flowchart illustrating a method implemented in a communication system in accordance with one embodiment of the present disclosure.

DETAILED DESCRIPTION

Figure 1:
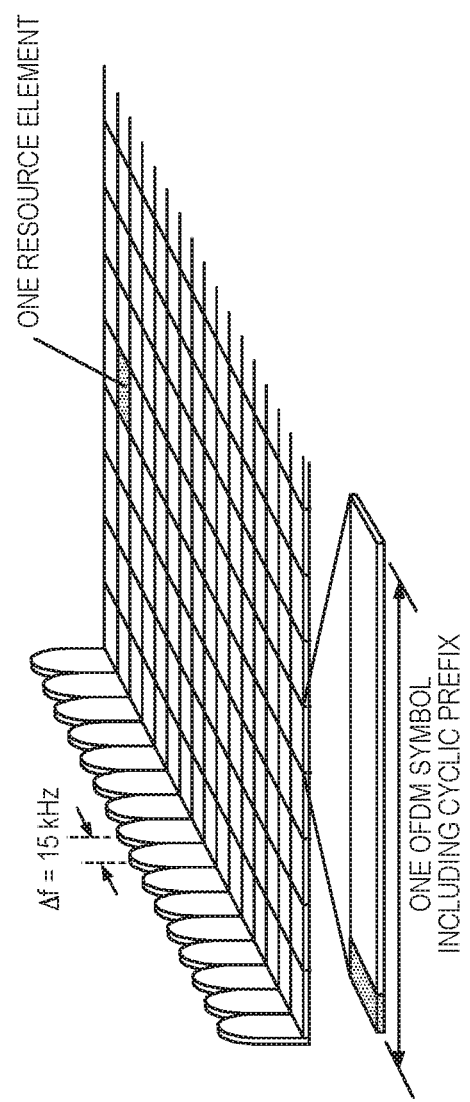
FIG. 1 is a schematic diagram providing an exemplary illustration of radio resources in New Radio (NR)

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless device.

Radio Access Node: As used herein, a "radio access node" or "radio network node" is any node in a radio access network of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), and a relay node.

Core Network Node: As used herein, a "core network node" is any type of node in a core network or any node that implements a core network function. Some examples of a core network node include, e.g., a Mobility Management Entity (MME), a Packet Data Network Gateway (PGW), a Service Capability Exposure Function (SCEF), a Home Subscriber Server (HSS), or the like. Some other examples of a core network node include a node implementing a Access and Mobility Function (AMF), a UPF, a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

Wireless Device: As used herein, a "wireless device" is any type of device that has access to (i.e., is served by) a cellular communications network by wirelessly transmitting and/or receiving signals to a radio access node(s). Some examples of a wireless device include, but are not limited to, a User Equipment device (UE) in a 3GPP network and a Machine Type Communication (MTC) device.

Network Node: As used herein, a "network node" is any node that is either part of the radio access network or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

Figure 2:
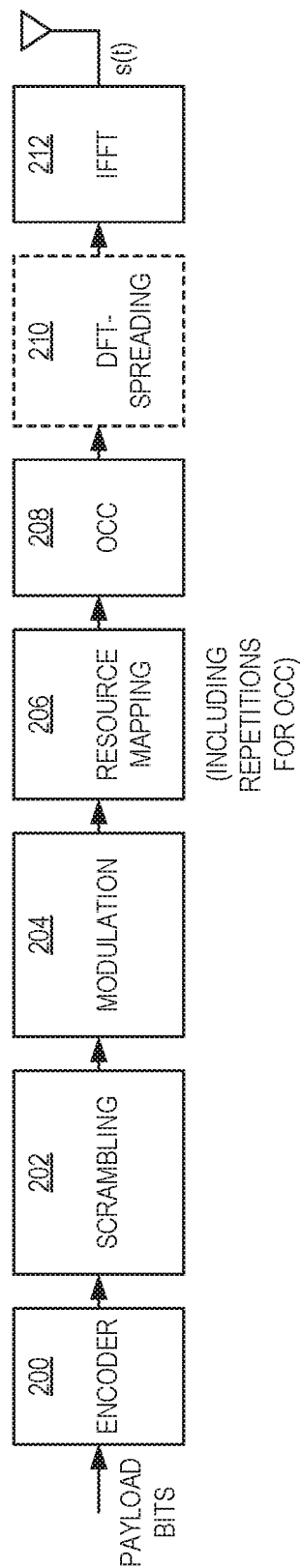
FIG. 2 is a block diagram providing an exemplary illustration of processing components for selecting Orthogonal Cover Codes (OCC) repetition sequence according to some embodiments of the present disclosure.

FIG. 2 is a block diagram providing an exemplary illustration of processing components for selecting Orthogonal Cover Codes (OCC) repetition sequence according to some embodiments of the present disclosure. As shown in FIG. 2, payload bits are encoded (step 200), scrambled (step 202), modulated (step 204), and resource mapped (step 206). In the embodiment illustrated in FIG. 2, the resource mapping step 206 includes selecting which information is to be repeated before the OCC is applied and generating that repeated data, which is then subjected to OCC (step 208), Discrete Fourier Transform (DFT) spreading (step 210), and Inverse Fast Fourier Transform (IFFT) processing (step 212), to create a transmitted signal s(t).

Figure 3:
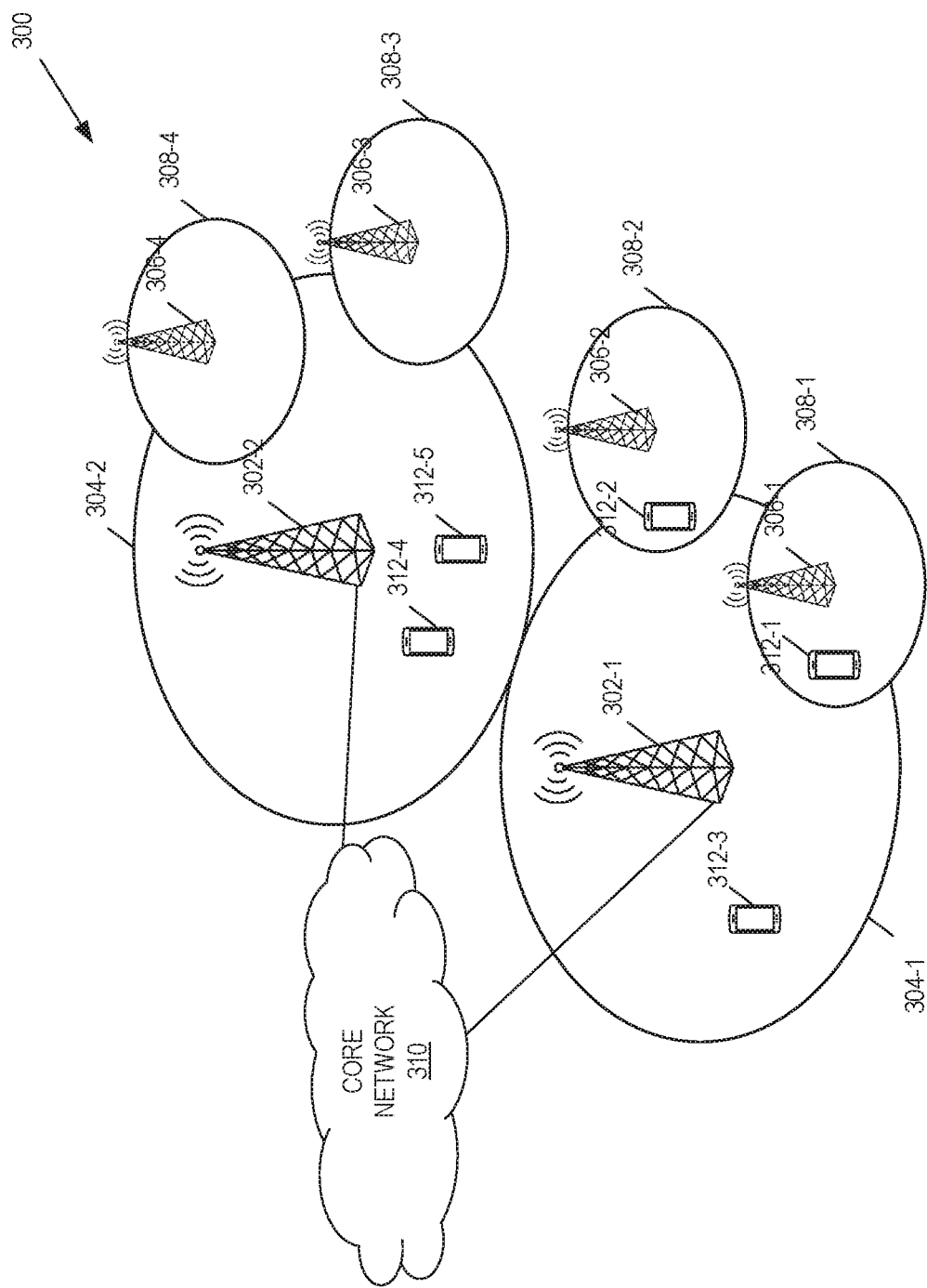
FIG. 3 illustrates one example of a cellular communications system in which embodiments of the present disclosure may be implemented.

FIG. 3 illustrates one example of a cellular communications system 300 in which embodiments of the present disclosure may be implemented. In the embodiments described herein, the cellular communications system 300 is a Fifth-Generation (5G) system (5GS) including a New Radio (NR) Radio Access Network (RAN). In this example, the RAN includes base stations 302-1 and 302-2, which in 5G NR are referred to as gNBs, controlling corresponding (macro) cells 304-1 and 304-2. The base stations 302-1 and 302-2 are generally referred to herein collectively as base stations 302 and individually as base station 302. Likewise, the (macro) cells 304-1 and 304-2 are generally referred to herein collectively as (macro) cells 304 and individually as (macro) cell 304. The RAN may also include a number of low power nodes 306-1 through 306-4 controlling corresponding small cells 308-1 through 308-4. The low power nodes 306-1 through 306-4 can be small base stations (such as pico or femto base stations) or Remote Radio Heads (RRHs), or the like. Notably, while not illustrated, one or more of the small cells 308-1 through 308-4 may alternatively be provided by the base stations 302. The low power nodes 306-1 through 306-4 are generally referred to herein collectively as low power nodes 306 and individually as low power node 306. Likewise, the small cells 308-1 through 308-4 are generally referred to herein collectively as small cells 308 and individually as small cell 308. The cellular communications system 310 also includes a core network 310, which in the 5GS is referred to as the 5G Core (5GC). The base stations 302 (and optionally the low power nodes 306) are connected to the core network 310.

The base stations 302 and the low power nodes 306 provide service to wireless devices 312-1 through 312-5 in the corresponding cells 304 and 308. The wireless devices 312-1 through 312-5 are generally referred to herein collectively as wireless devices 312 and individually as wireless device 312. The wireless devices 312 are also sometimes referred to herein as User Equipments (UEs).

In NR-U, Uplink (UL) transmission may be spread over multiple PRBs to satisfy the requirements for unlicensed band operation. For example, a Physical Uplink Control Channel (PUCCH) could be made to cover 10 PRBs instead of for example 1 PRB used in NR. Thus, in this case, the multiplexing capacity—the ability to multiplex multiple UEs within the available system bandwidth—is reduced by 90%, i.e., where 10 PRBs could formerly support 10 UEs occupying 1 PRB each, those 10 PRBs can now support only one UE occupying all 10 PRBs.

Two ways to improve the multiplexing capacity in an NR-Unlicensed (NR-U) network include inter Orthogonal Frequency Division Multiplexing (OFDM) symbol OCC and intra OFDM symbol OCC. In preparation for using OCC, certain information will be repeated over predefined OFDM symbols or resource elements. An OCC code, drawn from a set of OCC codes, is then applied over these repetitions. In a receiver, the same OCC code is applied again (but conjugated) and the repeated OFDM symbols are combined cancelling out any user using any of the other OCC codes in the set. The result is that the desired user can be isolated from the interfering users.

An OCC can be used on data OFDM symbols and resource elements carrying payload information. In that case the information that is repeated is a derivative of the payload.

An OCC can also be used on reference OFDM symbols and resource elements, such as Demodulation Reference Symbols (DMRS), for example, that carry predefined sequences that are used, for example, to estimate the channel. In some cases, the data payload is also transmitted using either a predefined sequence or a modified predefined sequence.

There currently exist certain challenge(s), however. As standardization for PUCCH transmissions in NR-U networks is still under development, the methods and configurations for enabling PUCCH transmissions in the NR-U network are not yet fully defined. For example, there is currently no specification in 3GPP standard to define how to generate an appropriate signal to fill enough bandwidth to meet the minimum occupied bandwidth requirement of the NR-U network despite the importance of having an appropriate PUCCH transmission mechanism in the NR-U network.

Certain aspects of the present disclosure and their embodiments may provide solutions to the aforementioned or other challenges. OCCs can be used to allow multiplexing of multiple UEs on the same physical resource (e.g., symbols in time domain and/or subcarriers in frequency domain). OCCs work by repeating the same information on different resources and applying an OCC drawn from a set of OCCs. When the repeated information is taken from a predefined set, where this information normally differs between the resources used by the OCC, a method to select the information to be repeated is needed. The present disclosure presents methods and systems for selecting which information is to be repeated before the OCC is applied.

Embodiments disclosed in the present disclosure are related to cases wherein the information being repeated is based on predefined sequences. Examples of such information include, but are not limited to, some sort of reference sequence (e.g., reference signals that follow a prescribed pattern) and payload data that is based on predefined sequences.

Predefined sequences may pose a particular challenge. For example, some predefined sequences define contents of a signal based on the signal's position in time domain (e.g., based on the subframe, slot, OFDM symbol number, etc.) and/or frequency domain (e.g., based on the PRB, subcarrier within the PRB, etc.). As such, a sequence generation algorithm may need to consider time and/or frequency to determine what symbol to transmit in a particular Resource Element (RE). This means that the OFDM symbols or REs over which to repeat information for the OCC may already have a certain sequence associated with the OFDM symbols or REs.

However, when using OCC, a transmitter should transmit multiple copies of identical information such that, after decoding using OCC, a receiver can soft-combine the multiple copies of the identical information to determine correct output.

This may lead to conflicting requirements. In one aspect, a transmitter using OCC should transmit multiple copies of the same information duplicated across frequencies or across time slots. In another aspect, some predefined sequences may change based on the frequency or time slot on in which the predefined sequences are transmitted. Accordingly, the information being duplicated across the frequencies or the time slots may not be the same if the information is duplicated based on a predefined sequence.

Thus, some method to decide which information to repeat is needed. The present disclosure presents different methods to select the information to be repeated on the resources (e.g., frequencies and/or time slots) to be used by the orthogonal cover code.

Figure 4:
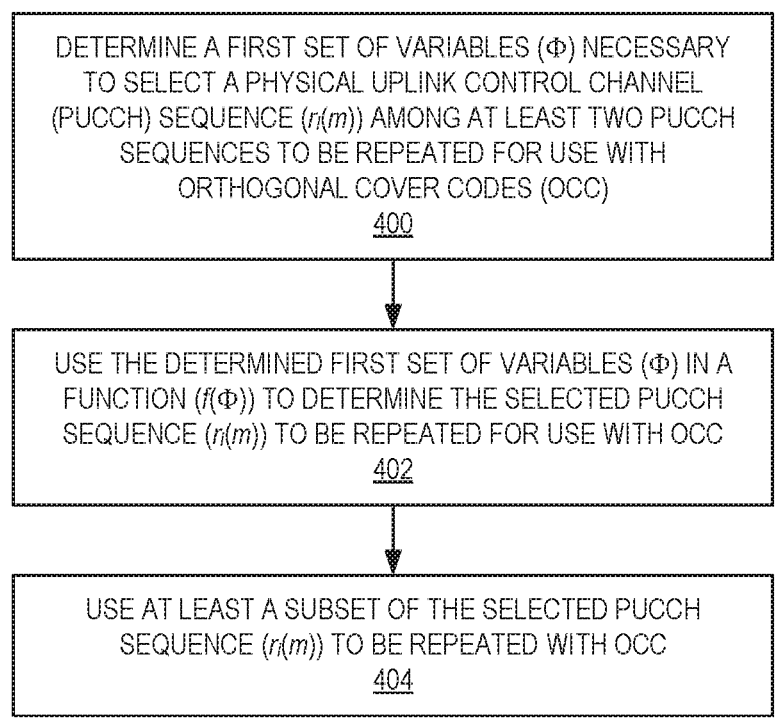
FIG. 4 is a flow chart illustrating an exemplary method for selecting a Physical Uplink Control Channel (PUCCH) OCC repetition sequence according to some embodiments of the present disclosure.

FIG. 4 is a flow chart illustrating an exemplary method for selecting a PUCCH OCC repetition sequence according to some embodiments of the present disclosure. In the embodiment illustrated in FIG. 4, a wireless device determines a first set of variables, $\Phi$, necessary to select a sequence to be repeated for use with OCC (step 400). This sequence is also referred to herein as a "PUCCH sequence" or "PUCCH OCC repetition sequence." Further, the PUCCH sequence is selected from among at least two PUSCH sequences. The wireless device then uses the determined first set of variables, $\Phi$, in a function, $f(\Phi)$, to determine the selected sequence to be repeated for use with OCC (step 402). The wireless device then uses the selected sequence to be repeated with OCC (step 404). Note, however, that in some other embodiments, the wireless device uses only a subset of the selected sequence to be repeated with the OCC, as described below.

To describe some embodiments of the present disclosure, we first denote the sequence to use in an OFDM symbol when OCC is not used with the following equation:

$$\Gamma = f(\Phi) \quad \text{(Eq. 1)}$$

where $\Gamma$ is necessary to indicate which sequence to use and $\Phi$ is the set of variables (i.e., first set of variables) necessary to indicate which sequence to use. Again, this selection of the sequence to use is from among multiple sequences. The present disclosure provides methods to select $\Gamma$ given multiple sets of variables $\Phi_i$ from the multiple resources (i.e., OFDM symbols in time domain and/or subcarriers in frequency domain) covered by the repetition for OCC. This selection may be expressed as the function $f_\Phi$, which is used to select $\Phi$, i.e., $$\Phi = f_\Phi(\Phi_0, \Phi_1, \ldots, \Phi_N) \quad \text{(Eq. 2)}$$

Combining equations 1 and 2 results in:

$$\Gamma = f(\Phi) = f(f_\Phi(\Phi_0, \Phi_1, \ldots, \Phi_N)) \quad \text{(Eq. 3)}$$

The selection can be made by calculating the minimum, maximum, mean, median, sum, product, selecting the first element or last element, of each individual variable in $\Phi$, or any other function $f_\Phi(\Phi_0, \Phi_1, \ldots, \Phi_N)$ of the sets of deciding variables.

In some embodiments, a predefined sequence is repeated across multiple time intervals. In this regard, the predefined sequence value is a function of the time slot and/or OFDM symbol in which the predefined sequence value is transmitted. For example, $\Phi_0$ may refer to a set of deciding variables used for slot or symbol 0, $\Phi_1$ may refer to a set of deciding variables used for slot or symbol 1, and so on.

In some embodiments, a predefined sequence is repeated across multiple frequencies. In this regard, the predefined sequence value is a function of the PRB and/or subcarrier in which the predefined sequence value is transmitted. For example, $\Phi_0$ may refer to a set of deciding variables used for PRB or subcarrier 0, $\Phi_1$ may refer to a set of deciding variables used for PRB or subcarrier 1, and so on.

In some other embodiments, $\Phi_0$ may refer to a set of deciding variables used for some combination of frequency and time, $\Phi_1$ may refer to a set of deciding variables used for another combination of frequency and time, and so on.

Note that, in the present disclosure, references are made to NR PUCCH format 2 and an enhanced NR PUCCH format 2. It is to be understood that what is described in relation to those formats is applicable also for formats based on those formats. Specific embodiments for enabling Inter OFDM Symbol OCC and Intra OFDM Symbol OCC are discussed next.

Inter OFDM Symbol OCC

For NR-U, inter OFDM symbol OCC (e.g., repetition of the same data in the time domain) is considered for the enhanced version of NR PUCCH format 2. As described in 3GPP Technical Specification (TS) 38.211 v15.6.0 2019-06 (hereinafter, "3GPP TS 38.211"), the DMRS sequence used for NR PUCCH format 2 is a Pseudo-random Number (PN)-sequence. For the PN-sequence, there are no cyclic shifts defined, hence cyclic shifts cannot be used to separate different user's DMRS. Instead, inter OFDM symbol OCC can be used for the DMRS part of NR PUCCH format 2. In this regard, the DMRS sequence to be repeated in all OFDM symbols needs to be defined, since each OFDM symbol covered by the OCC originally uses different DMRS sequences. The following describes different methods to select one DMRS sequence to repeat in all OFDM symbols.

For NR PUCCH format 2, the PN-sequence used as DMRS sequence (also referred to as the "selected sequence") for a specific OFDM symbol is calculated using the following equation, found in 3GPP TS 38.211:

$$r_l(m) = \frac{1}{\sqrt{2}}(1 - 2c(2m)) + j\frac{1}{\sqrt{2}}(1 - 2c(2m+1)), m = 0, 1 \ldots \quad \text{(Eq. 4)}$$

where c(i) is a binary array indicating which sequence $r_l(m)$ that is used. Since c uniquely defines the selected sequence $r_l(m)$ to use, $c(i)=\Gamma$. In a non-limiting example, c is a length-31 Gold sequence defined in 3GPP TS 38.211, where it is clear that the function that determines c depends on the OFDM symbol number within the slot, l, and the slot number of the slot within the radio frame, $n_{s,f}^\mu$. The other variables that decide c can be regarded as constants in this context. Hence, the definition of the Gold sequence and how the Gold sequence is initialized can be determined by the function $f(\Phi)$, i.e., as described in 3GPP TS 38.211:

$$f(\Phi) = \begin{cases} c(n) = (x_1(n+N_C) + x_2(n+N_C)) \bmod 2 \\ x_1(n+31) = (x_1(n+3) + x_1(n)) \bmod 2 \\ x_2(n+31) = (x_2(n+3) + x_2(n+2) + x_2(n+1) + x_2(n)) \bmod 2 \\ c_{init} = \left(2^{17}(N_{symb}^{slot}n_{s,f}^\mu + l + 1)(2N_{ID}^0 + 1) + 2N_{ID}^0\right) \bmod 2^{31} \end{cases} \quad \text{(Eq. 5)}$$

The method to derive the selected sequence $r_l(m)$ used for the enhanced NR PUCCH format 2 inter OFDM symbol OCC repetition of the DMRS part can be expressed in the equation below:

$$\Phi = f_\Phi(\Phi_0, \Phi_1, \ldots, \Phi_N) = f_\Phi(l_0, l_1, \ldots, l_N, n_{s,f\_0}^\mu, n_{s,f\_1}^\mu, \ldots, n_{s,f\_N}^\mu) \quad \text{(Eq. 6)}$$

where N+1 is the number of OFDM symbols, for the enhanced NR PUCCH format 2 N+1=2.

More specifically the mappings from $\Phi_0, \Phi_1, \ldots, \Phi_N$ to $\Phi$ can be described as following equations.

$$l = f_l(l_0, l_1, \ldots, l_N)$$
$$n_{s,f}^\mu = f_{n_{s,f}^\mu}(n_{s,f\_0}^\mu, n_{s,f\_1}^\mu, \ldots, n_{s,f\_N}^\mu) \quad \text{(Eq. 7)}$$

where $f_l()$ and $f_{n_{s,f}^\mu}()$ can be any combination of functions: minimum( ), maximum( ), mean( ), median( ), sum( ), product( ), first_element( ), last_element( ). In some embodiments, a combination with functions round( ), floor( ), ceil ( ) such that round( ), floor( ), ceil( ) are applied last such that the returned value is an integer.

In some embodiments, the above functions are defined as the following:
- minimum( ): The function returns the minimum value from the input values.
- maximum( ): The function returns the maximum value from the input values.
- mean( ): The function returns the average value of the input values.
- median( ): The function returns the median value of the input values.
- sum( ): The function returns the sum of all input values.
- product( ): The function returns the product of all input values.
- first_element( ): The function returns the first input value.
- last_element( ): The function returns the last input value.
- round( ): The function returns the value rounded to the nearest integer.
- floor( ): The function returns the value rounded down to the nearest integer.
- ceil( ): The function returns the value rounded up to the nearest integer.

An example of using the minimum( ) function for the enhanced NR PUCCH format 2 is shown in the equations below.

$$l = \min(l_0, l_1)$$
$$n_{s,f}^\mu = \min(n_{s,f\_0}^\mu, n_{s,f\_1}^\mu) \quad \text{(Eq. 8)}$$

which means that the selected sequence $r_l(m)$ to repeat in both OFDM symbols is the sequence which normally is used in the first of the two OFDM symbols. This can be written in an entirely different way by specifying that the $c_{init}$ used for the first OFDM symbol shall be (like it normally is)

$$c_{init\_0} = (2^{17}(N_{symb}^{slot}n_{s,f}^\mu + l + 1)(2N_{ID}^0 + 1) + 2N_{ID}^0) \bmod 2^{31} \quad \text{(Eq. 9)}$$

and that the $c_{init}$ for the second OFDM symbol shall be modified according to $$c_{init\_1} = (2^{17}(N_{symb}^{slot}n_{s,f}^\mu + l + 1)(2N_{ID}^0 + 1) + 2N_{ID}^0) \bmod 2^{31} \quad \text{(Eq. 10)}$$

Intra OFDM Symbol OCC

For NR-U, intra OFDM symbol OCC (e.g., repetition of the same data in the frequency domain) is also considered for the enhanced version of NR PUCCH format 2. Cyclic shifts are not defined for the PN-sequence. Instead, intra OFDM symbol OCC can be used for the DMRS part of the enhanced NR PUCCH format 2. In order to do that, the parts of the PN-sequence (e.g., the subset of the PN-sequence) that are to be repeated need to be defined, since fewer elements of the original PN-sequence will be used. The embodiments below provide different methods to select one sub-sequence to repeat in all resource elements within the OFDM symbol.

As described above, the sequence to use in a specific OFDM symbol is determined based on the equation (Eq. 1). That sequence has a specific length covering all resource elements within the OFDM symbol. Since information is repeated before applying the OCC, the required number of elements (herein denoted as S) in the defined sequence is a subset of all available elements (herein denoted as 7). Clearly, S<T. In other words, only a subset of the sequence as determined by the function, $f(\Phi)$, is repeated with OCC.

Denote the defined sequence, as determined by the function, $f(\Phi)$, with x(n), n=1 . . . T. This subset can be selected in multiple ways. For example, for n={1, 2, . . . , S−1, S, T−S+1, . . . T−1, T}, the subset may be defined as "every $m^{th}$ element of x(n) starting at any index n from 1 to m," for any value of m.

In a first embodiment of the present disclosure, a method for NR-U PUCCH OCC repetition sequence selection uses the equation (Eq. 3), shown above, to select a sequence $r_l(m)$ to be repeated for use with OCC. As previously mentioned, Γ is the set of variables necessary to indicate which sequence to use, Φ is the set of variables necessary to decide which sequence to use, function $f_\Phi$ selects the set Φ based on multiple sets of variables $\Phi_i$ from the multiple OFDM symbols or resources covered by the repetition for OCC, and N+1 is the number of separate resources (time, frequency, or both) to repeat on.

In a second embodiment of the present disclosure, the method of the first embodiment is applied to an enhanced NR PUCCH format 2 to support inter OFDM symbol OCC. In some embodiments, the method may employ Equation 3, shown above, expressed generally, or Equation 3 expressed in a more specific form, such as Equation 6, shown above, where N+1 is the number of separate resources to repeat on.

In a third embodiment of the present disclosure, the method of the second embodiment is employed, but where the mapping of Equation 6, shown above, is described as Equation 7, shown above, and so the equation thus becomes $$\Phi=\{l, n_{s,f}^\mu\} \quad \text{(Eq. 11)}$$

In a fourth embodiment of the present disclosure, the method of the third embodiment is employed, where $f_l(\ )$ and $f_{n_{s,f}^\mu}(\ )$, as shown in the equation (Eq. 7), can be any combination of functions: minimum( ), maximum( ), mean ( ), median( ), sum( ), product( ), first_element( ), last_element( ). Possibly in combination with functions round( ), floor( ), ceil( ) such that round( ), floor( ), ceil( ) are applied last such that the returned value is an integer. Where the individual functions are described in the list above the embodiments.

In a fifth embodiment of the present disclosure, the methods of the third and fourth embodiments are employed for a specific case when only 2 OFDM symbols are used and the minimum function min( ) is used:

$$l=\min(l_0, l_1)$$

$$n_{s,f}^\mu = \min(n_{s,f\_0}^\mu, n_{s,f\_1}^\mu). \quad \text{(Eq. 12)}$$

This can also be expressed in an entirely different way by specifying that the $c_{init}$ used for the first OFDM symbol shall be (like it normally is) modified according to Equation 9, shown above, and that the $c_{init}$ for the second OFDM symbol shall be modified according to Equation 10, shown above, and that otherwise the normal way to assign the sequences is used.

In a sixth embodiment of the present disclosure, the methods of the first through fifth embodiments are applied to any other PUCCH format or physical channel, and/or to another implementation of OCC not necessarily parametrized in the same way or using the same sequences. In some embodiments, for example, a position, index or value of something is used to derive a sequence.

In a seventh embodiment of the present disclosure, the method for NR-U PUCCH OCC repetition sequence selection can be used to select a subset of a sequence x(n) assigned to an OFDM symbol for use when intra OFDM symbol OCC are provided. For example, the method can include selecting the subset of the sequence as n={1, 2, . . . , S−1, S}, n={T−S+1, . . . T−1, T}, and so on. Notably, every $m^{th}$ element of x(n) starting at any index n from 1 to m, for any value of m, where T is the length of x(n) and S is the length of the subset.

In an eighth embodiment of the present disclosure, the method of the seventh embodiment is applied to an enhanced NR PUCCH format 2 to support intra OFDM symbol OCC.

Figure 5:
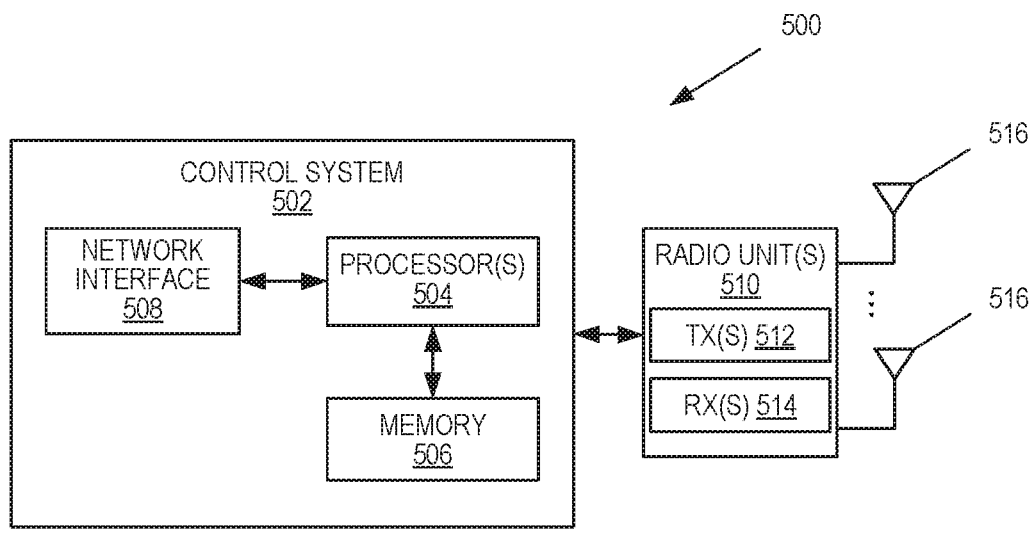
FIG. 5 is a schematic block diagram of a radio access node according to some embodiments of the present disclosure.

FIG. 5 is a schematic block diagram of a radio access node 500 according to some embodiments of the present disclosure. The radio access node 500 may be, for example, a base station 302 or 306. As illustrated, the radio access node 500 includes a control system 502 that includes one or more processors 504 (e.g., Central Processing Units (CPUs), Application Specific Integrated Circuits (ASICs), Field Programmable Gate Arrays (FPGAs), and/or the like), memory 506, and a network interface 508. The one or more processors 504 are also referred to herein as processing circuitry. In addition, the radio access node 500 includes one or more radio units 510 that each includes one or more transmitters 512 and one or more receivers 514 coupled to one or more antennas 516. The radio units 510 may be referred to or be part of radio interface circuitry. In some embodiments, the radio unit(s) 510 is external to the control system 502 and connected to the control system 502 via, e.g., a wired connection (e.g., an optical cable). However, in some other embodiments, the radio unit(s) 510 and potentially the antenna(s) 516 are integrated together with the control system 502. The one or more processors 504 operate to provide one or more functions of the radio access node 500 as described herein. In some embodiments, the function(s) is implemented in software that is stored, e.g., in the memory 506 and executed by the one or more processors 504.

Figure 6:
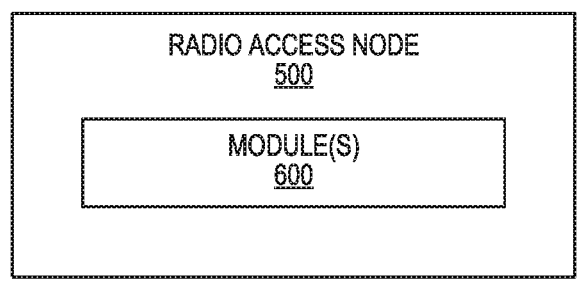
FIG. 6 is a schematic block diagram of the radio access node of FIG. 5 according to some other embodiments of the present disclosure.

FIG. 6 is a schematic block diagram of the radio access node 500 according to some other embodiments of the present disclosure. The radio access node 500 includes one or more modules 600, each of which is implemented in software. The module(s) 600 provides the functionality of the radio access node 500 described herein.

Figure 7:
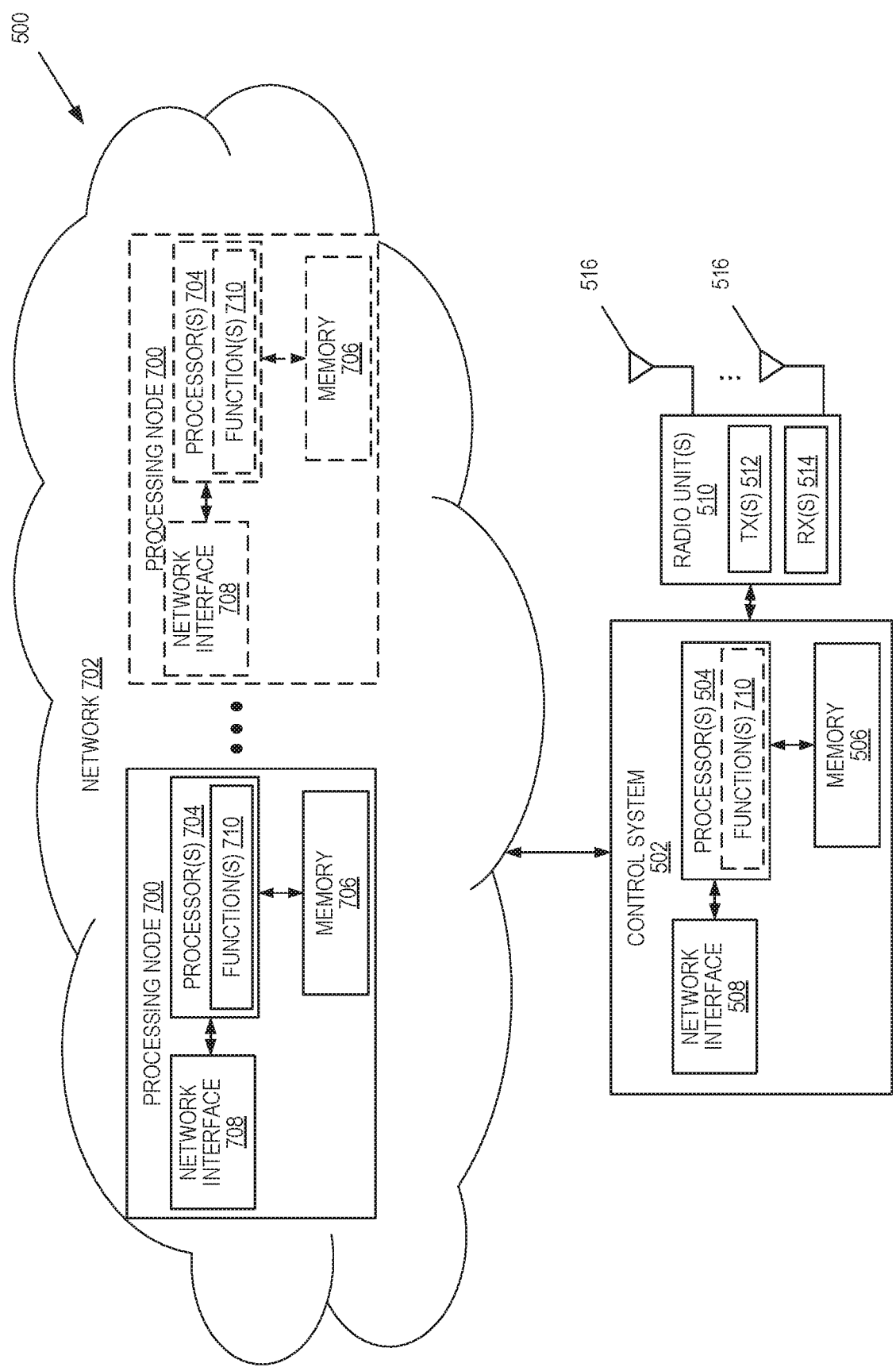
FIG. 7 is a schematic block diagram that illustrates a virtualized embodiment of the radio access node of FIG. 5 according to some embodiments of the present disclosure.

FIG. 7 is a schematic block diagram that illustrates a virtualized embodiment of the radio access node 500 according to some embodiments of the present disclosure. This discussion is equally applicable to other types of network nodes. Further, other types of network nodes may have similar virtualized architectures.

As used herein, a "virtualized" radio access node is an implementation of the radio access node 500 in which at least a portion of the functionality of the radio access node 500 is implemented as a virtual component(s) (e.g., via a virtual machine(s) executing on a physical processing node(s) in a network(s)). As illustrated, in this example, the radio access node 500 includes the control system 502 that includes the one or more processors 504 (e.g., CPUs, ASICs, FPGAs, and/or the like), the memory 506, and the network interface 508 and the one or more radio units 510 that each includes the one or more transmitters 512 and the one or more receivers 514 coupled to the one or more antennas 516, as described above. The control system 502 is connected to the radio unit(s) 510 via, for example, an optical cable or the like. The control system 502 is connected to one or more processing nodes 700 coupled to or included as part of a network(s) 702 via the network interface 508. Each processing node 700 includes one or more processors 704 (e.g., CPUs, ASICs, FPGAs, and/or the like), memory 706, and a network interface 708.

In this example, functions 710 of the radio access node 500 described herein are implemented at the one or more processing nodes 700 or distributed across the control system 502 and the one or more processing nodes 700 in any desired manner. In some particular embodiments, some or all of the functions 710 of the radio access node 500 described herein are implemented as virtual components executed by one or more virtual machines implemented in a virtual environment(s) hosted by the processing node(s) 700. As will be appreciated by one of ordinary skill in the art, additional signaling or communication between the processing node(s) 700 and the control system 502 is used in order to carry out at least some of the desired functions 710. Notably, in some embodiments, the control system 502 may not be included, in which case the radio unit(s) 510 communicates directly with the processing node(s) 700 via an appropriate network interface(s).

In some embodiments, a computer program including instructions which, when executed by at least one processor, causes the at least one processor to carry out the functionality of the radio access node 500 or a node (e.g., a processing node 700) implementing one or more of the functions 710 of the radio access node 500 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Notably, the discussion as previously presented in FIG. 6 is equally applicable to the processing node 700 where the modules 600 may be implemented at one of the processing nodes 700 or distributed across multiple processing nodes 700 and/or distributed across the processing node(s) 700 and the control system 602.

Figure 8:
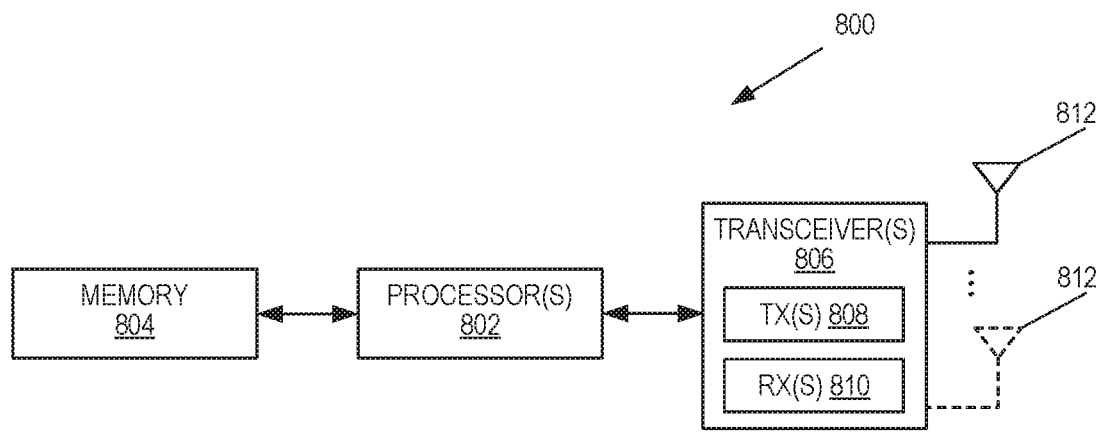
FIG. 8 is a schematic block diagram of a User Equipment (UE) according to some embodiments of the present disclosure.

FIG. 8 is a schematic block diagram of a UE 800 according to some embodiments of the present disclosure. As illustrated, the UE 800 includes one or more processors 802 (e.g., CPUs, ASICs, FPGAs, and/or the like), memory 804, and one or more transceivers 806 each including one or more transmitters 808 and one or more receivers 810 coupled to one or more antennas 812. The transceiver(s) 806 includes radio-front end circuitry connected to the antenna(s) 812 that is configured to condition signals communicated between the antenna(s) 812 and the processor(s) 802, as will be appreciated by one of ordinary skill in the art. The processors 802 are also referred to herein as processing circuitry. The transceivers 806 are also referred to herein as radio circuitry. In some embodiments, the functionality of the UE 800 described above may be fully or partially implemented in software that is, e.g., stored in the memory 804 and executed by the processor(s) 802. Note that the UE 800 may include additional components not illustrated in FIG. 8 such as, e.g., one or more user interface components (e.g., an input/output interface including a display, buttons, a touch screen, a microphone, a speaker(s), and/or the like and/or any other components for allowing input of information into the UE 800 and/or allowing output of information from the UE 800), a power supply (e.g., a battery and associated power circuitry), etc.

In some embodiments, a computer program including instructions which, when executed by at least one processor, causes the at least one processor to carry out the functionality of the UE 800 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 9:
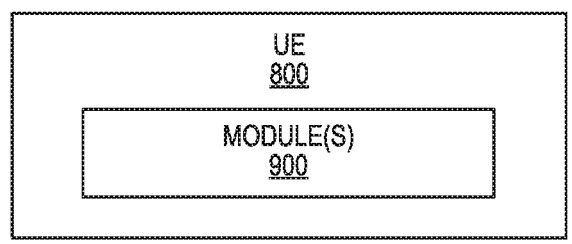
FIG. 9 is a schematic block diagram of the UE of FIG. 8 according to some other embodiments of the present disclosure.

FIG. 9 is a schematic block diagram of the UE 800 according to some other embodiments of the present disclosure. The UE 800 includes one or more modules 900, each of which is implemented in software. The module(s) 900 provides the functionality of the UE 800 described herein.

Figure 10:
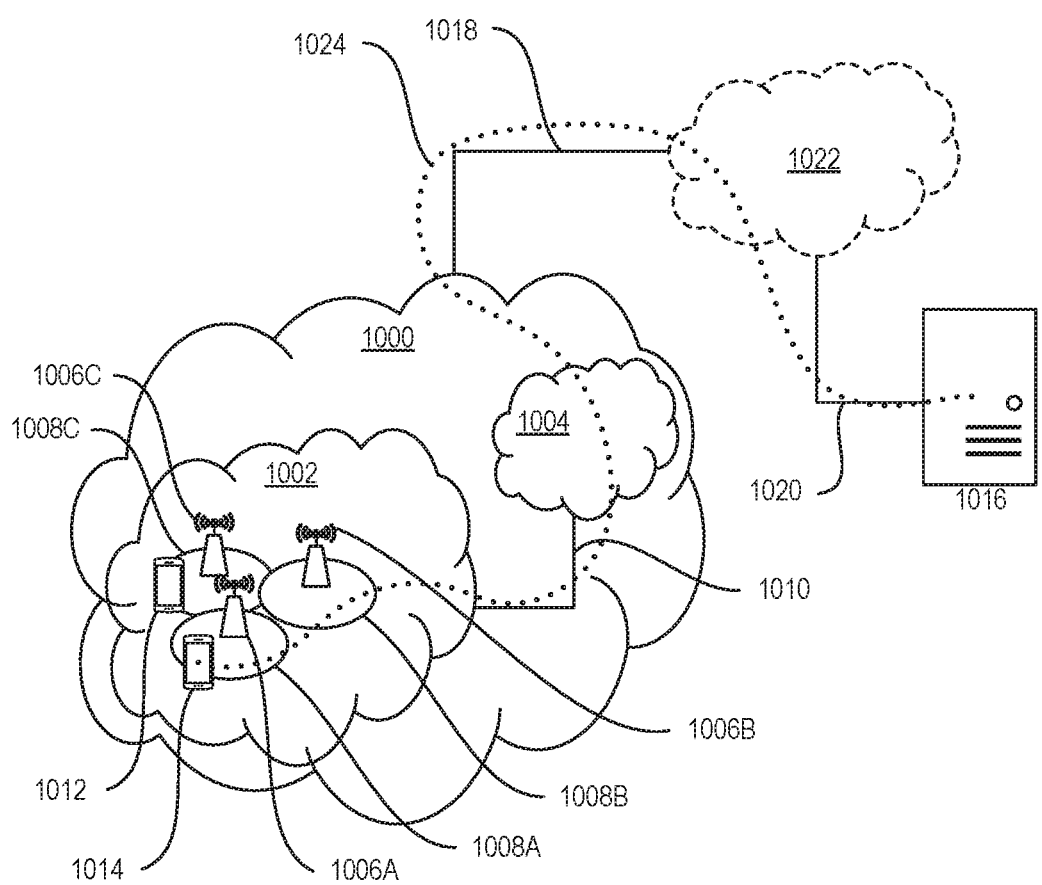
FIG. 10 is a schematic block diagram of a communication system includes a telecommunication network in accordance with an embodiment of the present disclosure.

With reference to FIG. 10, in accordance with an embodiment, a communication system includes a telecommunication network 1000, such as a 3GPP-type cellular network, which comprises an access network 1002, such as a RAN, and a core network 1004. The access network 1002 comprises a plurality of base stations 1006A, 1006B, 1006C, such as Node Bs, eNBs, gNBs, or other types of wireless Access Points (APs), each defining a corresponding coverage area 1008A, 1008B, 1008C. Each base station 1006A, 1006B, 1006C is connectable to the core network 1004 over a wired or wireless connection 1010. A first UE 1012 located in coverage area 1008C is configured to wirelessly connect to, or be paged by, the corresponding base station 1006C. A second UE 1014 in coverage area 1008A is wirelessly connectable to the corresponding base station 1006A. While a plurality of UEs 1012, 1014 are illustrated in this example, the disclosed embodiments are equally applicable to a situation where a sole UE is in the coverage area or where a sole UE is connecting to the corresponding base station 1006.

The telecommunication network 1000 is itself connected to a host computer 1016, which may be embodied in the hardware and/or software of a standalone server, a cloud-implemented server, a distributed server, or as processing resources in a server farm. The host computer 1016 may be under the ownership or control of a service provider, or may be operated by the service provider or on behalf of the service provider. Connections 1018 and 1020 between the telecommunication network 1000 and the host computer 1016 may extend directly from the core network 1004 to the host computer 1016 or may go via an optional intermediate network 1022. The intermediate network 1022 may be one of, or a combination of more than one of, a public, private, or hosted network; the intermediate network 1022, if any, may be a backbone network or the Internet; in particular, the intermediate network 1022 may comprise two or more sub-networks (not shown).

The communication system of FIG. 10 as a whole enables connectivity between the connected UEs 1012, 1014 and the host computer 1016. The connectivity may be described as an Over-the-Top (OTT) connection 1024. The host computer 1016 and the connected UEs 1012, 1014 are configured to communicate data and/or signaling via the OTT connection 1024, using the access network 1002, the core network 1004, any intermediate network 1022, and possible further infrastructure (not shown) as intermediaries. The OTT connection 1024 may be transparent in the sense that the participating communication devices through which the OTT connection 1024 passes are unaware of routing of uplink and downlink communications. For example, the base station 1006 may not or need not be informed about the past routing of an incoming downlink communication with data originating from the host computer 1016 to be forwarded (e.g., handed over) to a connected UE 1012. Similarly, the base station 1006 need not be aware of the future routing of an outgoing uplink communication originating from the UE 1012 towards the host computer 1016.

Example implementations, in accordance with an embodiment, of the UE, base station, and host computer discussed in the preceding paragraphs will now be described with reference to FIG. 11. In a communication system 1100, a host computer 1102 comprises hardware 1104 including a communication interface 1106 configured to set up and maintain a wired or wireless connection with an interface of a different communication device of the communication system 1100. The host computer 1102 further comprises processing circuitry 1108, which may have storage and/or processing capabilities. In particular, the processing circuitry 1108 may comprise one or more programmable processors, ASICs, FPGAs, or combinations of these (not shown) adapted to execute instructions. The host computer 1102 further comprises software 1110, which is stored in or accessible by the host computer 1102 and executable by the processing circuitry 1108. The software 1110 includes a host application 1112. The host application 1112 may be operable to provide a service to a remote user, such as a UE 1114 connecting via an OTT connection 1116 terminating at the UE 1114 and the host computer 1102. In providing the service to the remote user, the host application 1112 may provide user data which is transmitted using the OTT connection 1116.

The communication system 1100 further includes a base station 1118 provided in a telecommunication system and comprising hardware 1120 enabling it to communicate with the host computer 1102 and with the UE 1114. The hardware 1120 may include a communication interface 1122 for setting up and maintaining a wired or wireless connection with an interface of a different communication device of the communication system 1100, as well as a radio interface 1124 for setting up and maintaining at least a wireless connection 1126 with the UE 1114 located in a coverage area (not shown in FIG. 11) served by the base station 1118. The communication interface 1122 may be configured to facilitate a connection 1128 to the host computer 1102. The connection 1128 may be direct or it may pass through a core network (not shown in FIG. 11) of the telecommunication system and/or through one or more intermediate networks outside the telecommunication system. In the embodiment shown, the hardware 1120 of the base station 1118 further includes processing circuitry 1130, which may comprise one or more programmable processors, ASICs, FPGAs, or combinations of these (not shown) adapted to execute instructions. The base station 1118 further has software 1132 stored internally or accessible via an external connection.

The communication system 1100 further includes the UE 1114 already referred to. The UE's 1114 hardware 1134 may include a radio interface 1136 configured to set up and maintain the wireless connection 1126 with a base station serving a coverage area in which the UE 1114 is currently located. The hardware 1134 of the UE 1114 further includes processing circuitry 1138, which may comprise one or more programmable processors, ASICs, FPGAs, or combinations of these (not shown) adapted to execute instructions. The UE 1114 further comprises software 1140, which is stored in or accessible by the UE 1114 and executable by the processing circuitry 1138. The software 1140 includes a client application 1142. The client application 1142 may be operable to provide a service to a human or non-human user via the UE 1114, with the support of the host computer 1102. In the host computer 1102, the executing host application 1112 may communicate with the executing client application 1142 via the OTT connection 1116 terminating at the UE 1114 and the host computer 1102. In providing the service to the user, the client application 1142 may receive request data from the host application 1112 and provide user data in response to the request data. The OTT connection 1116 may transfer both the request data and the user data. The client application 1142 may interact with the user to generate the user data that it provides.

Figure 11:
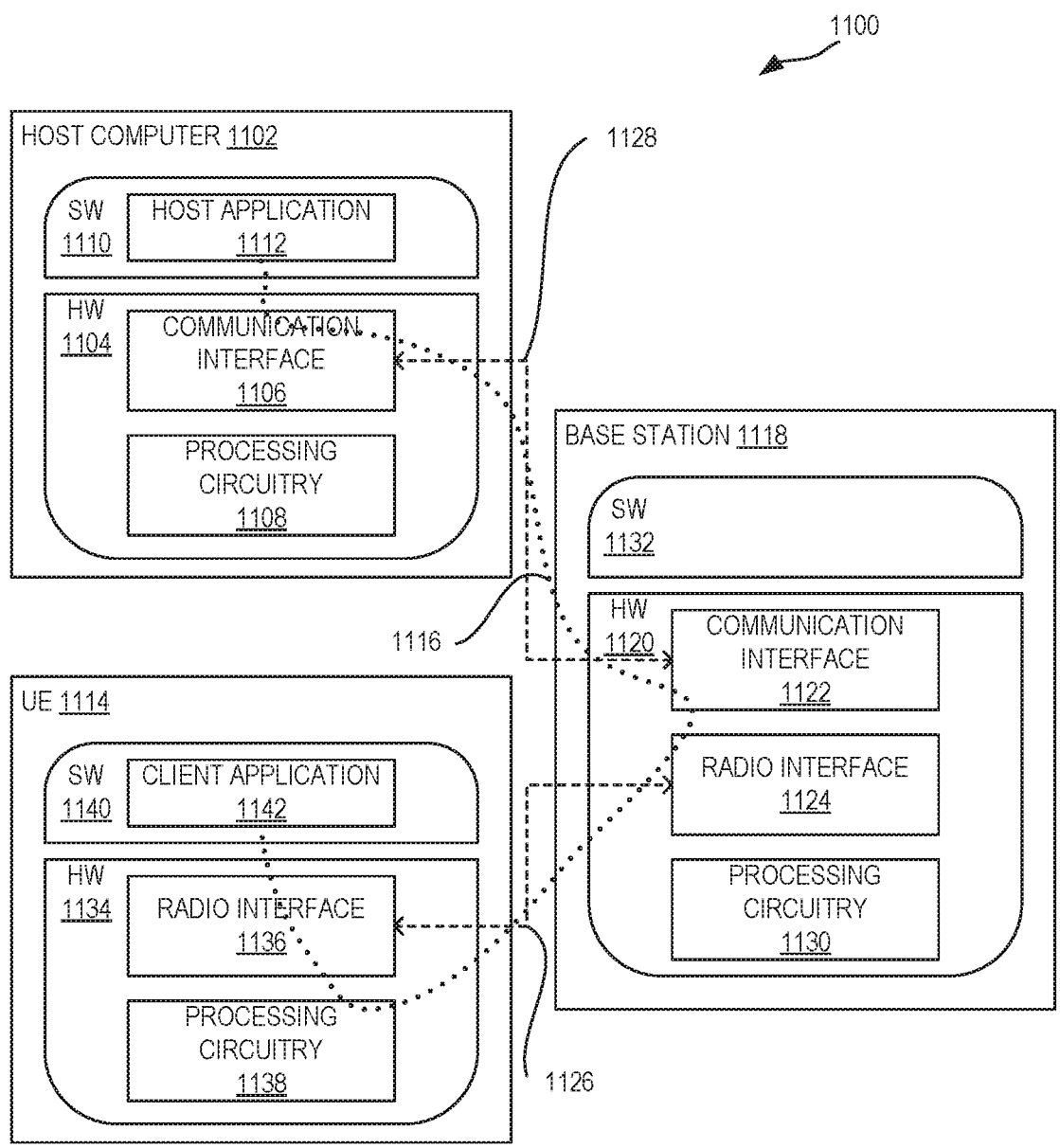
FIG. 11 is a schematic block diagram of exemplary implementations of UE, base station, and host computer discussed in FIGS. 6-10 in accordance with an embodiment of the present disclosure.

It is noted that the host computer 1102, the base station 1118, and the UE 1114 illustrated in FIG. 11 may be similar or identical to the host computer 1016, one of the base stations 1006A, 1006B, 1006C, and one of the UEs 1012, 1014 of FIG. 10, respectively. This is to say, the inner workings of these entities may be as shown in FIG. 11 and independently, the surrounding network topology may be that of FIG. 10.

In FIG. 11, the OTT connection 1116 has been drawn abstractly to illustrate the communication between the host computer 1102 and the UE 1114 via the base station 1118 without explicit reference to any intermediary devices and the precise routing of messages via these devices. The network infrastructure may determine the routing, which may be configured to hide from the UE 1114 or from the service provider operating the host computer 1102, or both. While the OTT connection 1116 is active, the network infrastructure may further take decisions by which it dynamically changes the routing (e.g., on the basis of load balancing consideration or reconfiguration of the network).

The wireless connection 1126 between the UE 1114 and the base station 1118 is in accordance with the teachings of the embodiments described throughout this disclosure. One or more of the various embodiments improve the performance of OTT services provided to the UE 1114 using the OTT connection 1116, in which the wireless connection 1126 forms the last segment. More precisely, the teachings of these embodiments may be used to satisfy the minimum bandwidth occupancy requirement and the maximum power density spectrum requirements in NR-U.

A measurement procedure may be provided for the purpose of monitoring data rate, latency, and other factors on which the one or more embodiments improve. There may further be an optional network functionality for reconfiguring the OTT connection 1116 between the host computer 1102 and the UE 1114, in response to variations in the measurement results. The measurement procedure and/or the network functionality for reconfiguring the OTT connection 1116 may be implemented in the software 1110 and the hardware 1104 of the host computer 1102 or in the software 1140 and the hardware 1134 of the UE 1114, or both. In some embodiments, sensors (not shown) may be deployed in or in association with communication devices through which the OTT connection 1116 passes; the sensors may participate in the measurement procedure by supplying values of the monitored quantities exemplified above, or supplying values of other physical quantities from which the software 1110, 1140 may compute or estimate the monitored quantities. The reconfiguring of the OTT connection 1116 may include message format, retransmission settings, preferred routing, etc.; the reconfiguring need not affect the base station 1118, and it may be unknown or imperceptible to the base station 1118. Such procedures and functionalities may be known and practiced in the art. In certain embodiments, measurements may involve proprietary UE signaling facilitating the host computer 1102's measurements of throughput, propagation times, latency, and the like. The measurements may be implemented in that the software 1110 and 1140 causes messages to be transmitted, in particular empty or 'dummy' messages, using the OTT connection 1116 while it monitors propagation times, errors, etc.

Figure 12:
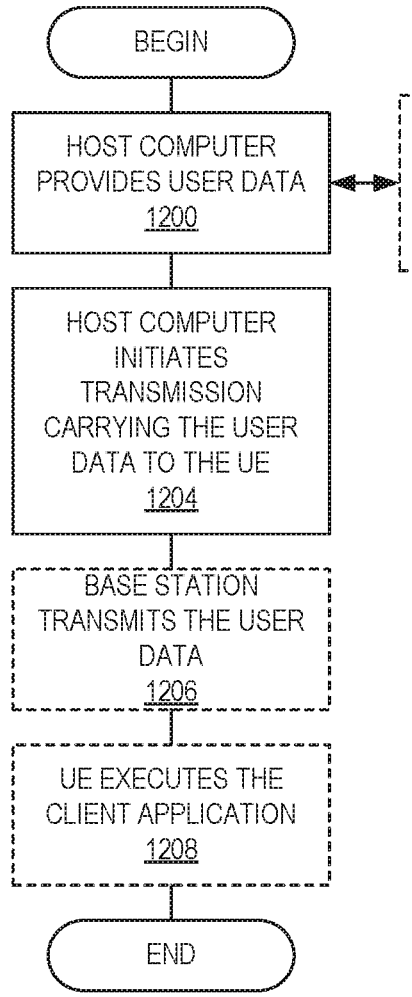
FIG. 12 is a flowchart illustrating a method implemented in a communication system in accordance with one embodiment of the present disclosure.

FIG. 12 is a flowchart illustrating a method implemented in a communication system, in accordance with one embodiment. The communication system includes a host computer, a base station, and a UE which may be those described with reference to FIGS. 10 and 11. For simplicity of the present disclosure, only drawing references to FIG. 12 will be included in this section. In step 1200, the host computer provides user data. In sub-step 1202 (which may be optional) of step 1200, the host computer provides the user data by executing a host application. In step 1204, the host computer initiates a transmission carrying the user data to the UE. In step 1206 (which may be optional), the base station transmits to the UE the user data which was carried in the transmission that the host computer initiated, in accordance with the teachings of the embodiments described throughout this disclosure. In step 1208 (which may also be optional), the UE executes a client application associated with the host application executed by the host computer.

Figure 13:
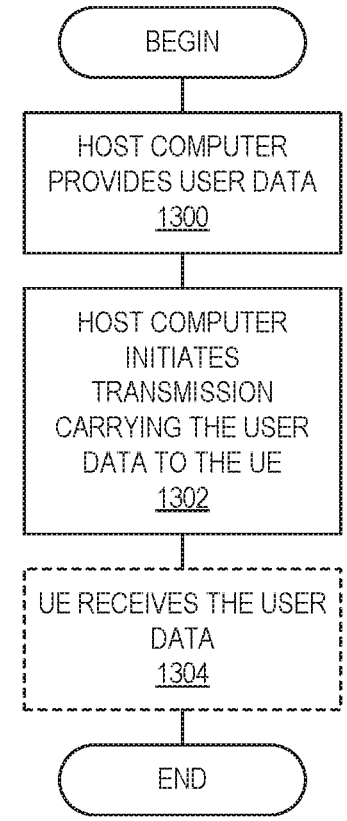
FIG. 13 is a flowchart illustrating a method implemented in a communication system in accordance with one embodiment of the present disclosure.

FIG. 13 is a flowchart illustrating a method implemented in a communication system, in accordance with one embodiment. The communication system includes a host computer, a base station, and a UE which may be those described with reference to FIGS. 10 and 11. For simplicity of the present disclosure, only drawing references to FIG. 13 will be included in this section. In step 1300 of the method, the host computer provides user data. In an optional sub-step (not shown) the host computer provides the user data by executing a host application. In step 1302, the host computer initiates a transmission carrying the user data to the UE. The transmission may pass via the base station, in accordance with the teachings of the embodiments described throughout this disclosure. In step 1304 (which may be optional), the UE receives the user data carried in the transmission.

FIG. 14 is a flowchart illustrating a method implemented in a communication system, in accordance with one embodiment. The communication system includes a host computer, a base station, and a UE which may be those described with reference to FIGS. 10 and 11. For simplicity of the present disclosure, only drawing references to FIG. 14 will be included in this section. In step 1400 (which may be optional), the UE receives input data provided by the host computer. Additionally or alternatively, in step 1402, the UE provides user data. In sub-step 1404 (which may be optional) of step 1400, the UE provides the user data by executing a client application. In sub-step 1406 (which may be optional) of step 1402, the UE executes a client application which provides the user data in reaction to the received input data provided by the host computer. In providing the user data, the executed client application may further consider user input received from the user. Regardless of the specific manner in which the user data was provided, the UE initiates, in sub-step 1408 (which may be optional), transmission of the user data to the host computer. In step 1410 of the method, the host computer receives the user data transmitted from the UE, in accordance with the teachings of the embodiments described throughout this disclosure.

FIG. 15 is a flowchart illustrating a method implemented in a communication system, in accordance with one embodiment. The communication system includes a host computer, a base station, and a UE which may be those described with reference to FIGS. 10 and 11. For simplicity of the present disclosure, only drawing references to FIG. 15 will be included in this section. In step 1500 (which may be optional), in accordance with the teachings of the embodiments described throughout this disclosure, the base station receives user data from the UE. In step 1502 (which may be optional), the base station initiates transmission of the received user data to the host computer. In step 1504 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

Some example embodiments of the present disclosure are as follows.

Embodiment 1: A method, performed by a wireless device, for selecting a Physical Uplink Control Channel, PUCCH, Orthogonal Cover Code, OCC, repetition sequence, the method comprising: determining a first set of variables, $\Phi$, necessary to select a sequence to be repeated for use with OCC; using the determined first set of variables to determine a second set of variables, $\Gamma$, necessary to indicate the selected sequence to be repeated for use with OCC; and using the indicated selected sequence to be repeated with OCC.

Embodiment 2: The method of embodiment 1 wherein determining the first set of variables $\Phi$ comprises determining the first set of variables $\Phi$ using a function $f_\Phi$ that selects the first set of variables $\Phi$ based on a plurality of sets of variables $\Phi_0, \Phi_1, \ldots, \Phi_N$.

Embodiment 3: The method of embodiment 2 wherein the function $f_{101}$ selects the first set of variables $\Phi$ based on a calculation performed on at least one of the plurality sets of variables $\Phi_0, \Phi_1, \ldots, \Phi_N$.

Embodiment 4: The method of embodiment 3 wherein the calculation performed on at least one of the plurality of sets of variables $\Phi_0, \Phi_1, \ldots, \Phi_N$ comprises performing at least one of the following set of functions: minimum( ), maximum( ), mean( ), median( ), sum( ), product( ), first_element( ), last_element( ), round( ), floor( ), and ceil( ).

Embodiment 5: The method of embodiment 2 wherein the function $f_{101}$ selects the first set of variables $\Phi$ based on the OFDM symbol number with the slot, l, and the slot number within the radio frame, $n_{s,f}^\mu$: $\Phi = f_\Phi(l_0, l_1, \ldots, l_N, n_s n_{s,f\_0}^\mu, n_{s,f\_1}^\mu, \ldots, n_{s,f\_N}^\mu)$.

Embodiment 6: The method of embodiment 5 wherein $l=f_l(l_0, l_1, \ldots, l_N)$ and $n_{s,f}{}^\mu=f_{n_{s,f}{}^\mu}(n_{s,f\_0}{}^\mu, n_{s,f\_1}{}^\mu, \ldots, n_{s,f\_N}{}^\mu)$.

Embodiment 7: The method of embodiment 6 wherein $f_l()$ and $f_{n_{s,f}{}^\mu}()$ comprise any combination of one or more the following set of functions: minimum( ), maximum( ), mean ( ), median( ), sum( ), product( ), first_element( ), last_element( ), round( ), floor( ), and ceil( ).

Embodiment 8: The method of any of embodiments 1-7 wherein the method is applied to an enhanced NR PUCCH format 2 to support inter-OFDM symbol OCC or intra-OFDM symbol OCC.

Embodiment 9: The method of any of embodiments 1-8 wherein the method further comprises selecting a subset of a sequence x(n) assigned to an OFDM symbol for use with intra OFDM symbol OCC.

Embodiment 10: The method of embodiment 9 wherein selecting the subset of a sequence x(n) comprises selecting the subset of the sequence as n={1, 2, . . . , S−1, S, T−S+1, . . . T−1, T}, every $m^{th}$ element of x(n) starting at any index n from 1 to m, for a specified value of m, where T is the length of x(n) and S is the length of the subset.

Embodiment 11: A wireless device, comprising: one or more processors; and memory storing instructions executable by the one or more processors, whereby the wireless device is operable to perform any of the steps of the methods of any of embodiments 1-10.

Embodiment 12: A User Equipment, UE, comprising: an antenna configured to send and receive wireless signals; radio front-end circuitry connected to the antenna and to processing circuitry, and configured to condition signals communicated between the antenna and the processing circuitry; the processing circuitry being configured to perform any of the steps of the methods of any of embodiments 1-10; an input interface connected to the processing circuitry and configured to allow input of information into the UE to be processed by the processing circuitry; an output interface connected to the processing circuitry and configured to output information from the UE that has been processed by the processing circuitry; and a battery connected to the processing circuitry and configured to supply power to the UE.

Embodiment 13: A User Equipment, UE, configured to communicate with a base station, the UE comprising a radio interface and processing circuitry configured to perform any of the steps of the methods of any of embodiments 1-10.

Embodiment 14: A communication system including a User Equipment, UE, and a base station, the UE comprising a radio interface and processing circuitry configured to perform any of the steps of the methods of any of embodiments 1-10.

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
5G Fifth Generation
5GC Fifth Generation Core network
5GS Fifth Generation System
AMF Access and Mobility Management Function
AN Access Network
AP Access Point
ASIC Application Specific Integrated Circuit
AUSF Authentication Server Function
BS Base Station
BWP Bandwidth Part
CP Cyclic Prefix
CPU Central Processing Unit
CSI Channel State Information
DCI Downlink Control Information
DFT Discrete Fourier Transform
DMRS Demodulation Reference Signal
DSP Digital Signal Processor
eMBB Enhanced Mobile Broadband
eNB Enhanced or Evolved Node B
FPGA Field Programmable Gate Array
gNB New Radio Base Station
HARQ Hybrid Automatic Repeat Request
HSS Home Subscriber Server
IFFT Inverse Fast Fourier Transform
LTE Long Term Evolution
MME Mobility Management Entity
MTC Machine Type Communication
NEF Network Exposure Function
NF Network Function
NR New Radio
NRF Network Function Repository Function
NR-U New Radio-Unlicensed (frequencies)
NSSF Network Slice Selection Function
OCC Orthogonal Cover Code
OFDM Orthogonal Frequency Division Multiplexing
OTT Over-the-Top
PBCH Physical Broadcast Channel
PCF Policy Control Function
PDCCH Physical Downlink Control Channel
PDSCH Physical Downlink Shared Channel
PGW Packet Gateway
PN Pseudo-random Number/Pseudo-random Noise
PRACH Physical Random Access Channel
PRB Physical Resource Block
PSD Power Spectral Density
PSS Primary Synchronization Signal
PUCCH Physical Uplink Control Channel
PUSCH Physical Uplink Shared Channel
RA Random Access
RAM Random Access Memory
RAN Radio Access Network
RAR Random Access Response
RE Resource Element
RMSI Remaining Minimum System Information
ROM Read Only Memory
RRC Radio Resource Control
RRH Remote Radio Head
RS Reference Signal
SCEF Service Capability Exposure Function
SCS Subcarrier Spacing
SI System Information
SIB System Information Block
SMF Session Management Function
SS Synchronization Signal
SSS Secondary Synchronization Signal
TS Technical Specification
UDM Unified Data Management
UE User Equipment
UL Uplink
URLLC Ultra-Reliable Low Latency Communication Those skilled in the art will recognize improvements and modifications to the embodiments of the present disclosure. All such improvements and modifications are considered within the scope of the concepts disclosed herein.

What is claimed is:

1. A method, performed by a wireless device, for selecting a Physical Uplink Control Channel, PUCCH, Orthogonal Cover Code, OCC, repetition sequence, the method comprising:
   determining a first set of variables, $\Phi$, necessary to select a PUCCH sequence, $r_l(m)$, among at least two PUCCH sequences to be repeated with OCC;
   using the determined first set of variables, $\Phi$, in a function, $f(\Phi)$, to determine the selected PUCCH sequence, $r_l(m)$, among the at least two PUCCH sequences to be repeated with OCC; and
   using at least a subset of the selected PUCCH sequence, $r_l(m)$, to be repeated with OCC;
   wherein the first set of variables $\Phi$ comprises at least one Orthogonal Frequency Division Multiplexing, OFDM, symbol number within a slot, l, and a respective slot number of the slot within a radio frame, $n_{s,f}^\mu$.

2. The method of claim 1 wherein determining the first set of variables $\Phi$ comprises determining the first set of variables $\Phi$ using a function $f_\Phi$ that selects the first set of variables $\Phi$ based on a plurality of sets of variables $\Phi_0, \Phi_1, \ldots, \Phi_N$.

3. The method of claim 2 wherein the function $f_\Phi$ selects the first set of variables $\Phi$ based on a calculation performed on at least one of the plurality of sets of variables $\Phi_0, \Phi_1, \ldots, \Phi_N$.

4. The method of claim 3 wherein the calculation performed on the at least one of the plurality of sets of variables $\Phi_0, \Phi_1, \ldots, \Phi_N$ comprises performing at least one of the following set of functions: minimum( ), maximum( ), mean( ), median( ), sum( ), product( ), first_element( ), last_element( ), round( ), floor( ), and ceil( ).

5. The method of claim 1 wherein:
   the at least one OFDM symbol within the slot, l, is determined based on a function $f_l(\ )$ expressed as: $l=f_l(l_0, l_1, \ldots, l_N)$; and
   the respective slot number of the slot within the radio frame, $n_{s,f}^\mu$, is determined based on a function $f_{n_{s,f}^\mu}(\ )$ expressed as: $n_{s,f}^\mu = f_{n_{s,f}^\mu}(n_{s,f\_0}^\mu, n_{s,f\_1}^\mu, \ldots, n_{s,f\_N}^\mu)$.

6. The method of claim 5 wherein the function $f_l(\ )$ and the function $f_{n_{s,f}^\mu}(\ )$ each comprise any combination of one or more of the following set of functions: minimum( ), maximum( ), mean( ), median( ), sum( ), product( ), first_element( ), last_element( ), round( ), floor( ), and ceil( ).

7. The method of claim 1 wherein using the determined first set of variables to determine the selected PUCCH sequence comprises determining the selected PUCCH sequence as a Pseudo-random Number (PN)-sequence based on the function, $f(\Phi)$, of the first set of variables, $\Phi$.

8. The method of claim 7 wherein the function, $f(\Phi)$, for determining the selected PUCCH sequence defines the selected PUCCH sequence based on a length-31 Gold sequence.

9. The method of claim 1 wherein the method is applied to an enhanced NR PUCCH format 2 to support inter-OFDM symbol OCC or intra-OFDM symbol OCC.

10. The method of claim 1 wherein the PUCCH sequence, $r_l(m)$ is further denoted as a sequence $x(n)$.

11. The method of claim 10 wherein using at least a subset of the selected PUCCH sequence, $r_l(m)$, to be repeated with OCC comprises selecting a subset of the sequence $x(n)$ by selecting the subset of the sequence as any one of:
   n={1, 2, . . . , S−1, S};
   n={T−S+1, . . . T−1, T}; and
   every $m^{th}$ element of $x(n)$ starting at any index n from 1 to m, for a specified value of m;
   wherein T is the length of $x(n)$ and S is the length of the subset.

12. A wireless device comprising:
   processing circuitry configured to:
      determine a first set of variables, $\Phi$, necessary to select a Physical Uplink Control Channel, PUCCH, sequence, $r_l(m)$, among at least two PUCCH sequences to be repeated with Orthogonal Cover Code, OCC;
      use the determined first set of variables, $\Phi$, in a function, $f(\Phi)$, to determine the selected PUCCH sequence, $r_l(m)$, among the at least two PUCCH sequences to be repeated with OCC; and
      use at least a subset of the selected PUCCH sequence, $r_l(m)$, to be repeated with OCC;
      wherein the first set of variables $\Phi$ comprises at least one Orthogonal Frequency Division Multiplexing, OFDM, symbol number within a slot, l, and a respective slot number of the slot within a radio frame, $n_{s,f}^\mu$.

13. The wireless device of claim 12 wherein the processing circuitry is further configured to determine the first set of variables $\Phi$ using a function $f_\Phi$ that selects the first set of variables $\Phi$ based on a plurality of sets of variables $\Phi_0, \Phi_1, \ldots, \Phi_N$.

14. The wireless device of claim 13 wherein the function $f_{101}$ selects the first set of variables $\Phi$ based on a calculation performed on at least one of the plurality of sets of variables $\Phi_0, \Phi_1, \ldots, \Phi_N$.

15. The wireless device of claim 14 wherein the calculation performed on the at least one of the plurality of sets of variables $\Phi_0, \Phi_1, \ldots, \Phi_N$ comprises performing at least one of the following set of functions: minimum( ), maximum( ), mean( ), median( ), sum( ), product( ), first_element( ), last_element( ), round( ), floor( ), and ceil( ).

16. The wireless device of claim 12 wherein:
   the at least one OFDM symbol within the slot, l, is determined based on a function $f_l(\ )$ expressed as: $l=f_l(l_0, l_1, \ldots, l_N)$; and
   the respective slot number of the slot within the radio frame, $n_{s,f}^\mu$, is determined based on a function $f_{n_{s,f}^\mu}(\ )$ expressed as: $n_{s,f}^\mu = f_{n_{s,f}^\mu}(n_{s,f\_0}^\mu, n_{s,f\_1}^\mu, \ldots, n_{s,f\_N}^\mu)$.

17. The wireless device of claim 16 wherein the function $f_l(\ )$ and the function $f_{n_{s,f}^\mu}(\ )$ each comprise any combination of one or more the following set of functions: minimum( ), maximum( ), mean( ), median( ), sum( ), product( ), first_element( ), last_element( ), round( ), floor( ), and ceil( ).

18. The wireless device of claim 12 wherein the processing circuitry is further configured to determine the selected PUCCH sequence as a Pseudo-random Number (PN)-sequence based on the function, $f(\Phi)$, of the first set of variables, $\Phi$.

19. The wireless device of claim 18 wherein the function, $f(\Phi)$, defines the selected PUCCH sequence based on a length-31 Gold sequence.

20. The wireless device of claim 12 wherein the processing circuitry is further configured to use at least a subset of the selected PUCCH sequence to be repeated with OCC in an enhanced NR PUCCH format 2 to support inter-OFDM symbol OCC or intra-OFDM symbol OCC.

21. The wireless device of claim 12 wherein the PUCCH sequence, $r_l(m)$ is further denoted as a sequence $x(n)$.

22. The wireless device of claim 21 wherein the processing circuitry is further configured to select a subset of the sequence x(n) by selecting the subset of the sequence as any one of:
  n={1, 2, . . . , S−1, S};
  n={T−S+1, . . . T−1, T}; and
  every $m^{th}$ element of x(n) starting at any index n from 1 to m, for a specified value of m;
  wherein T is the length of x(n) and S is the length of the subset.

* * * * *